UNITED STATES PATENT OFFICE.

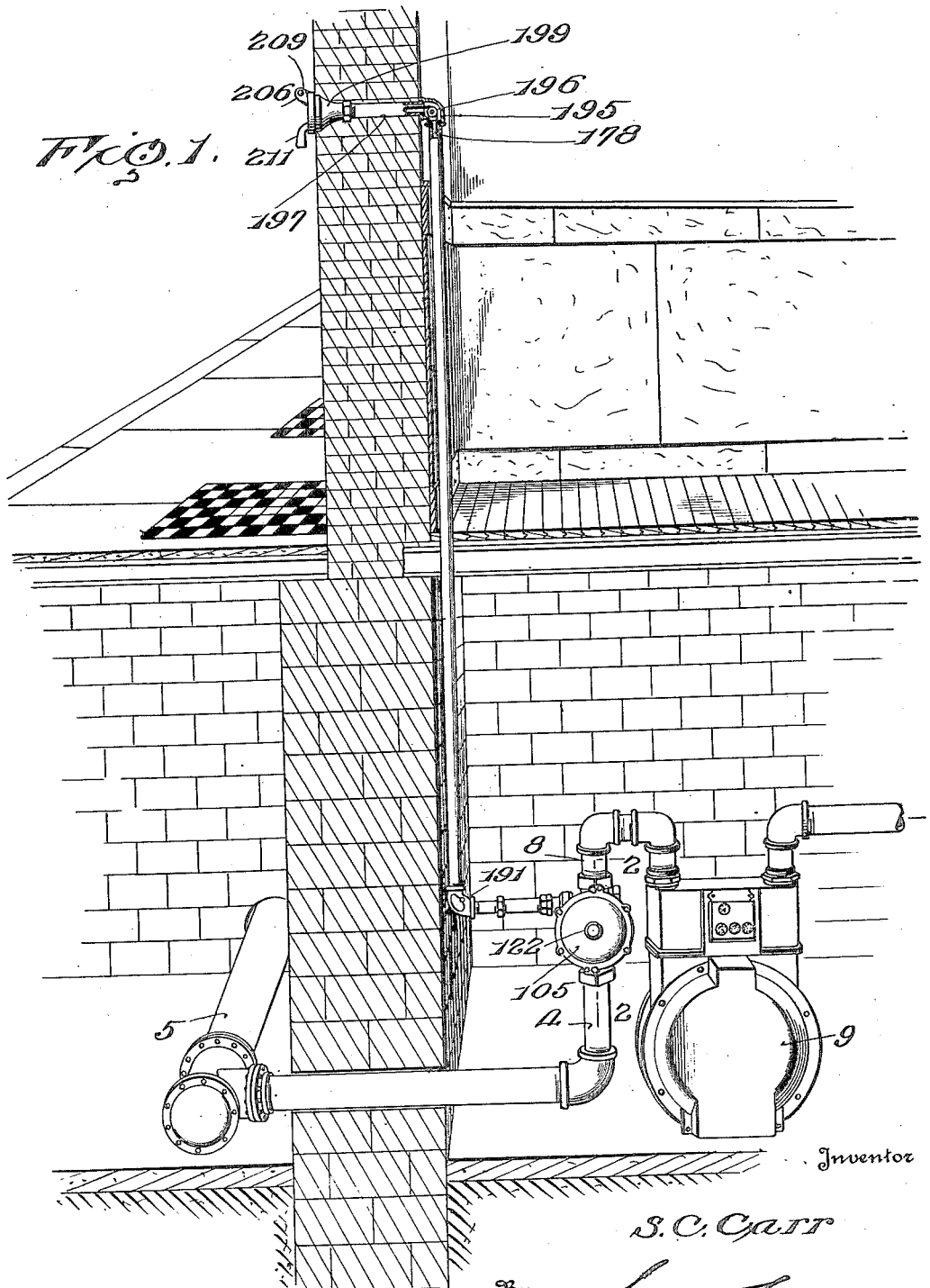

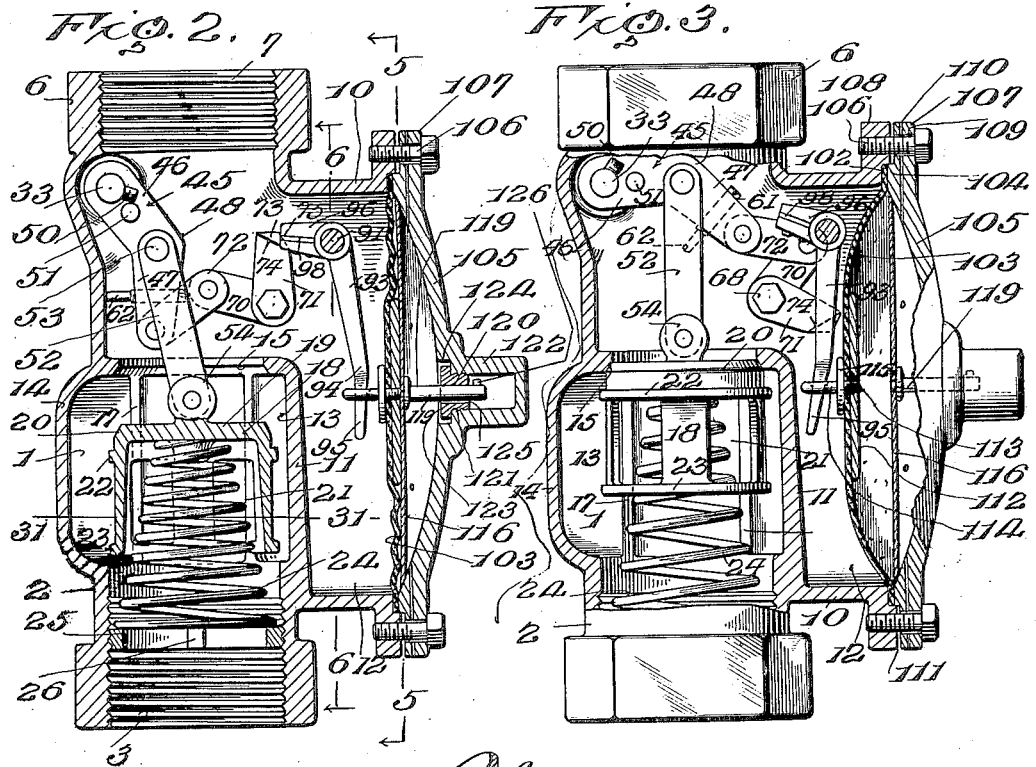
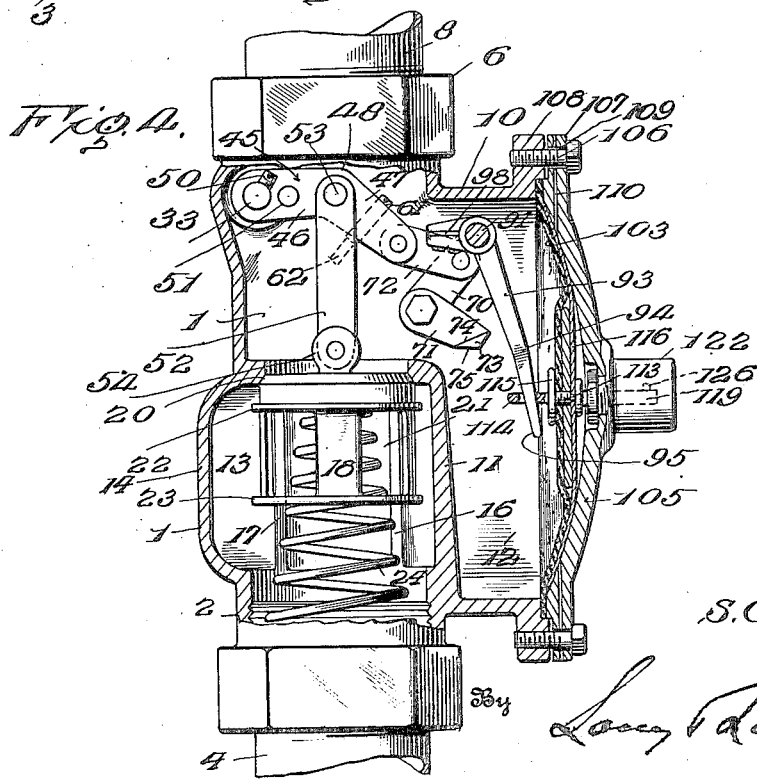

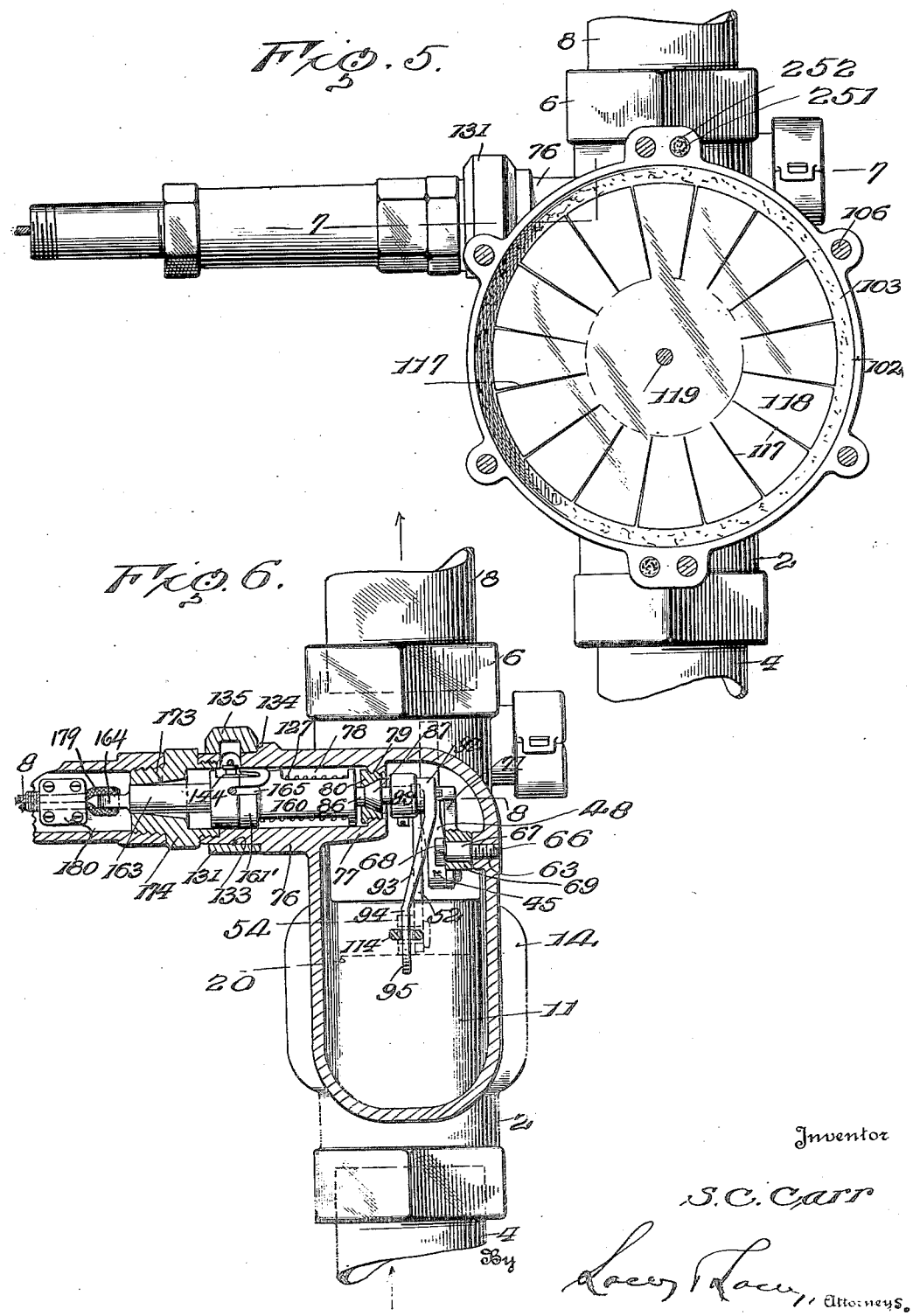

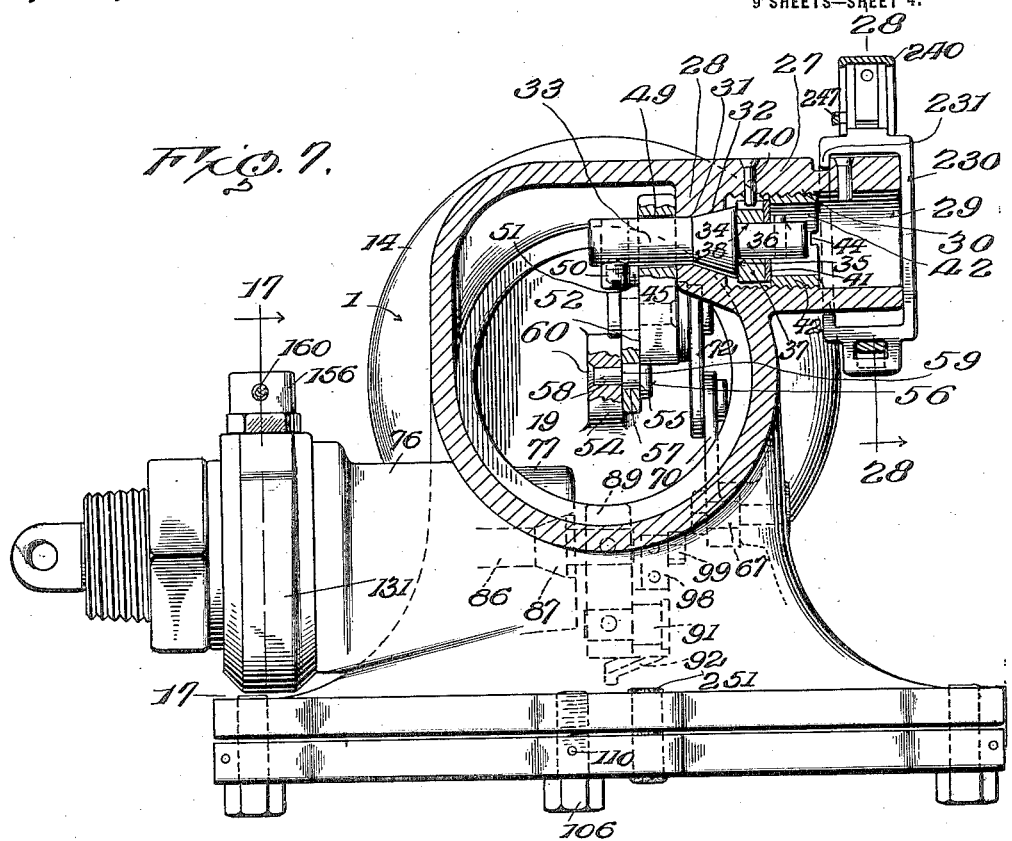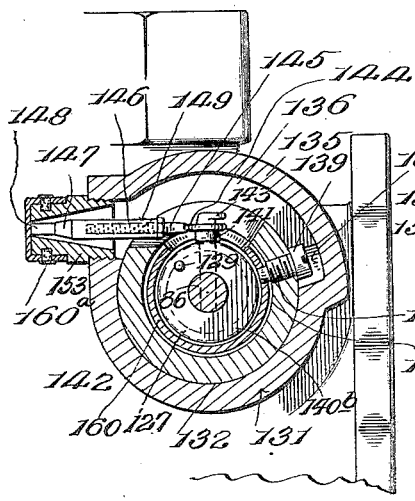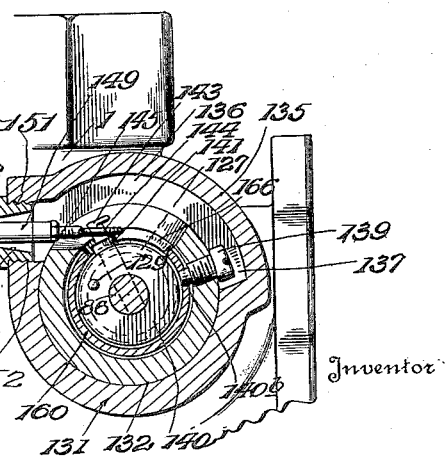

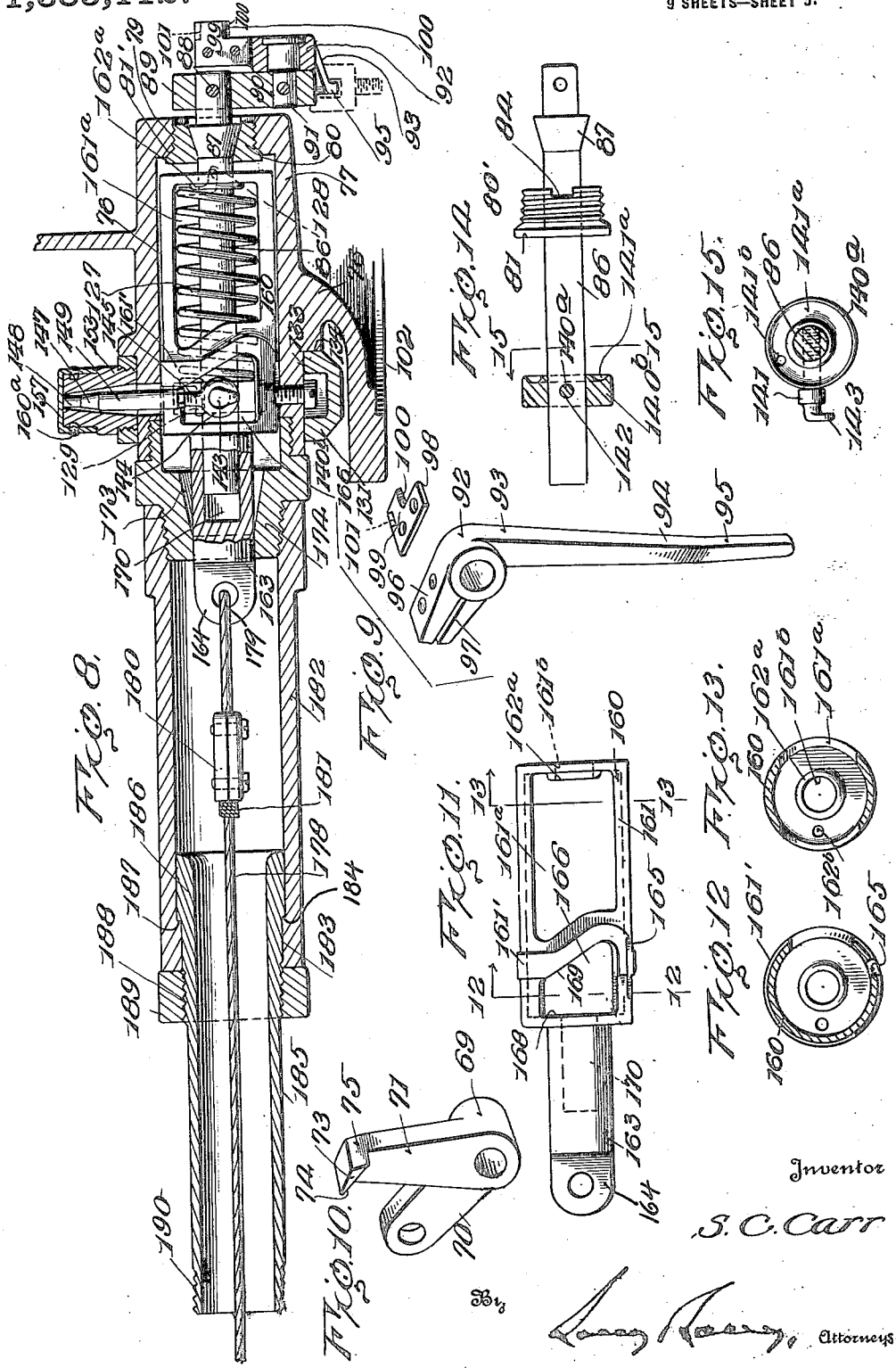

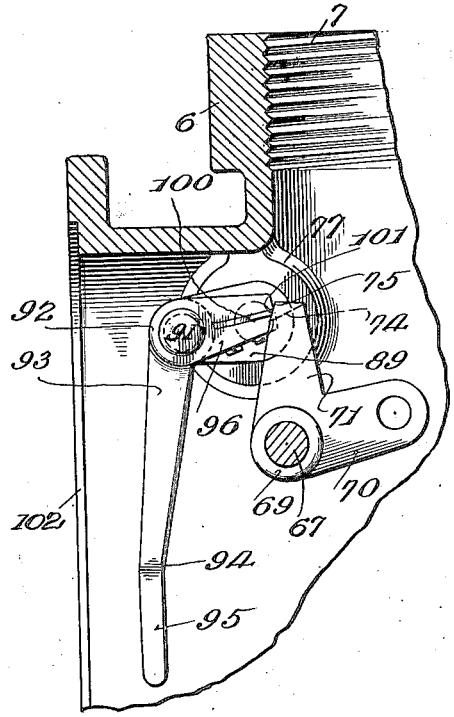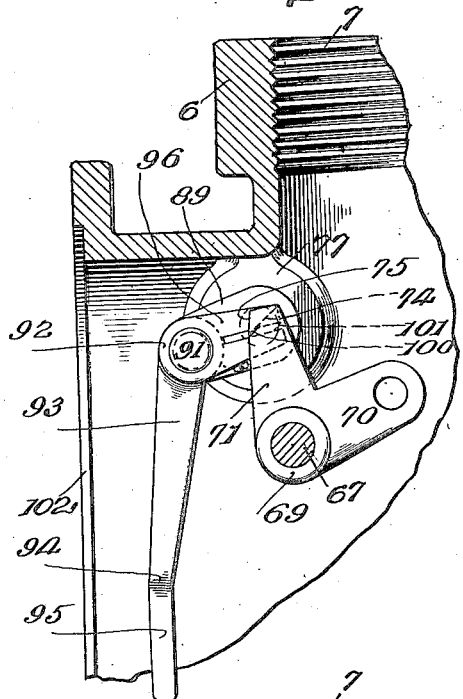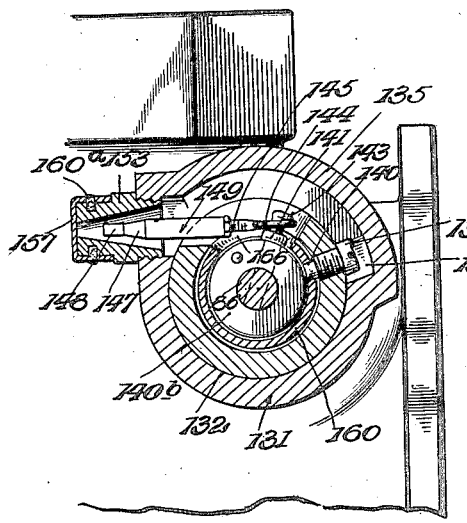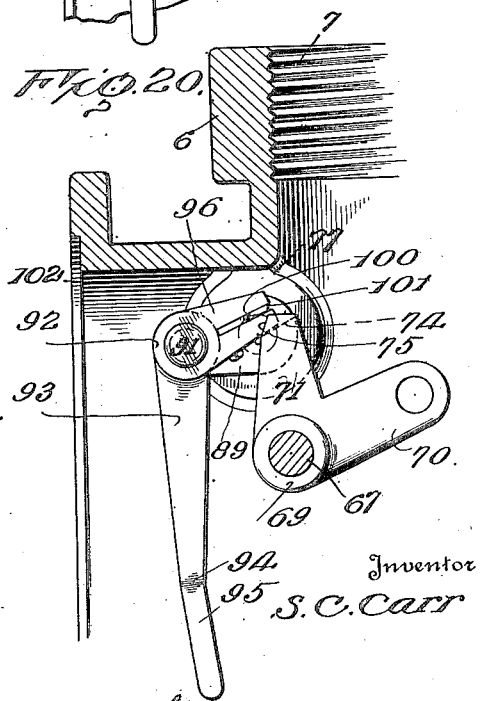

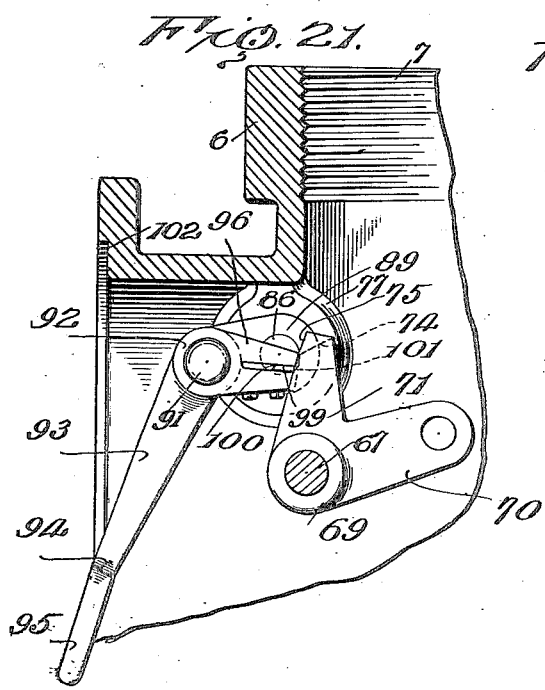
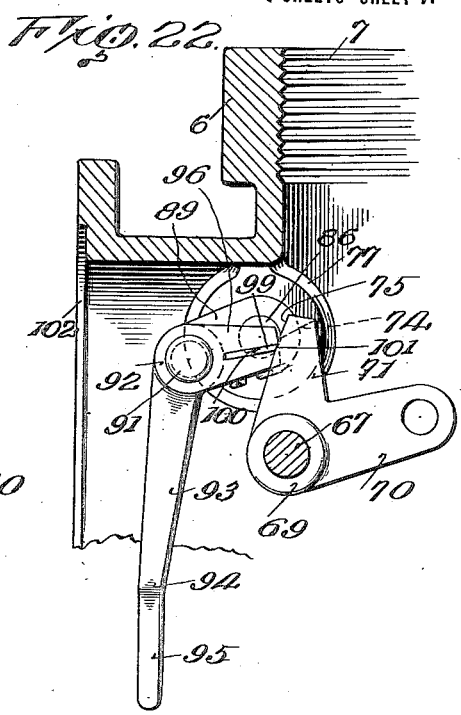
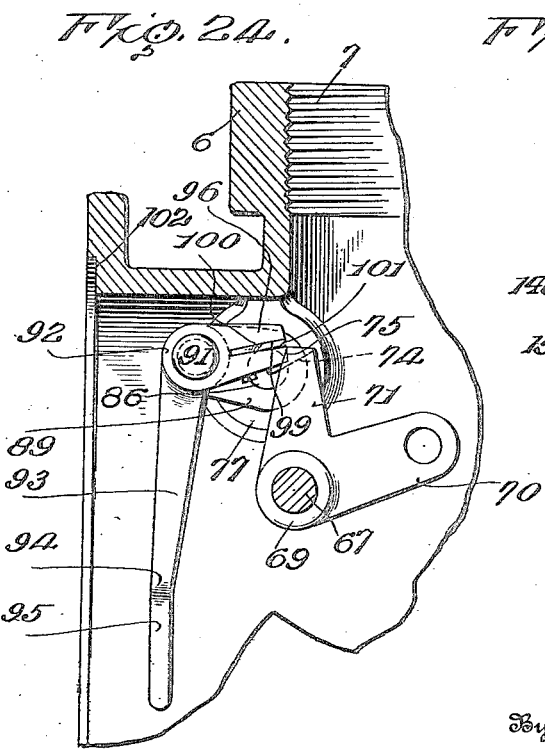
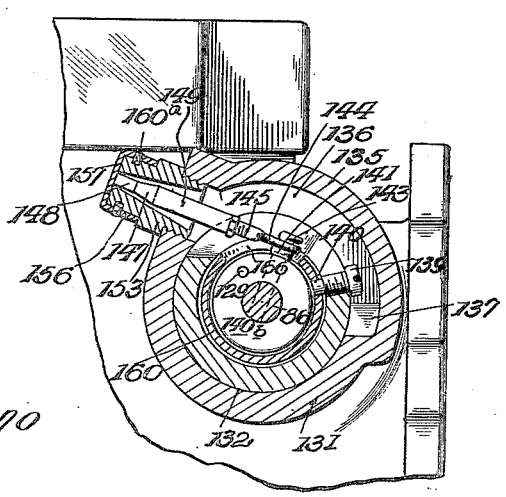

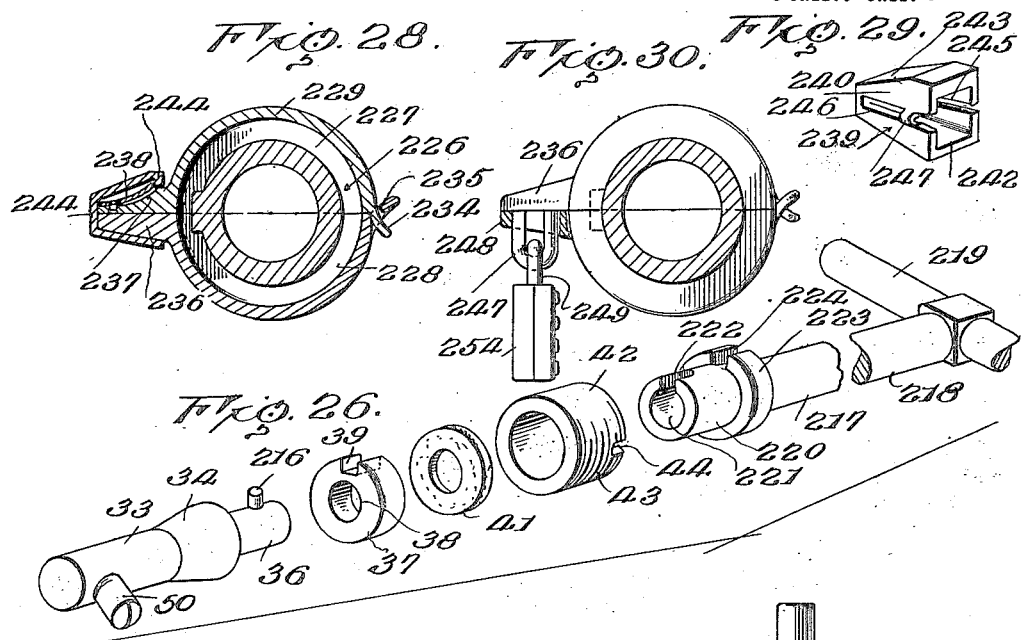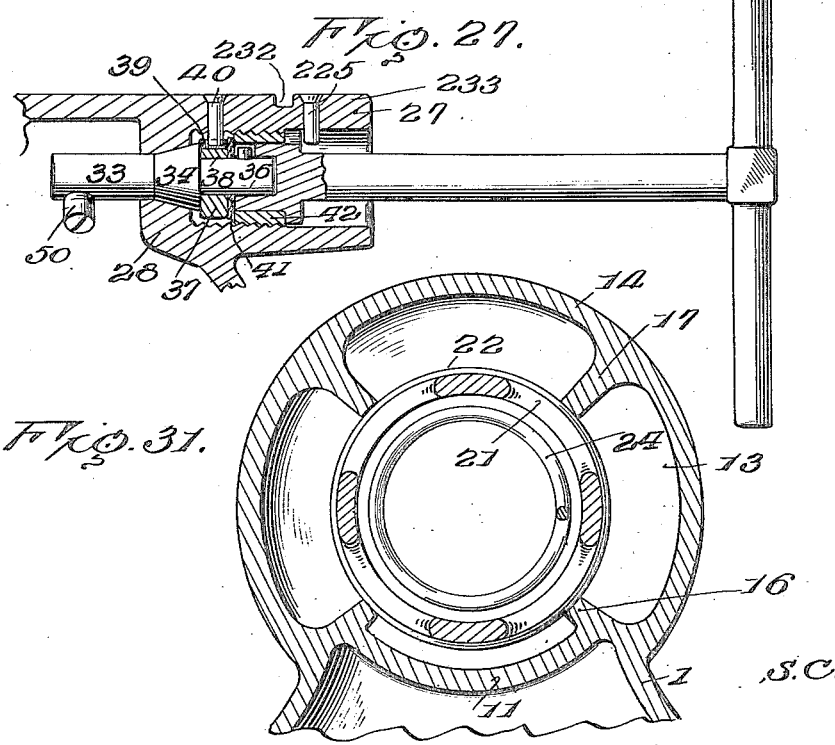

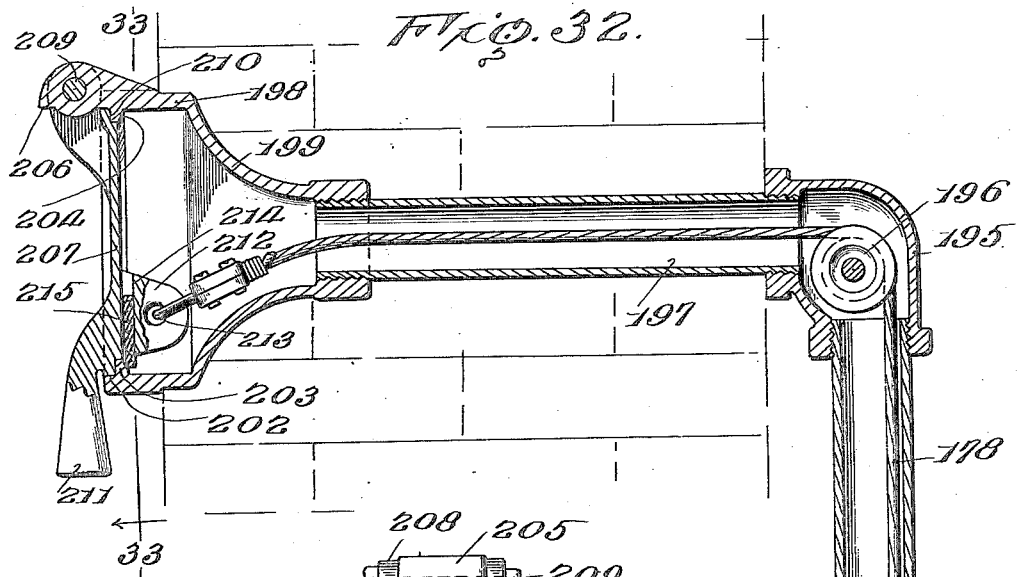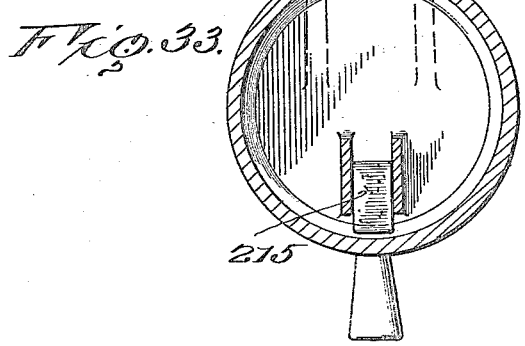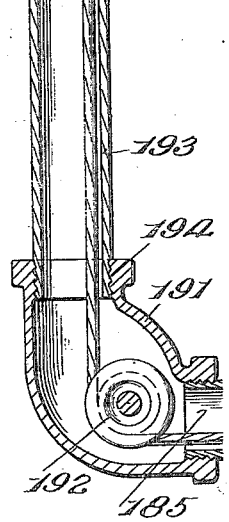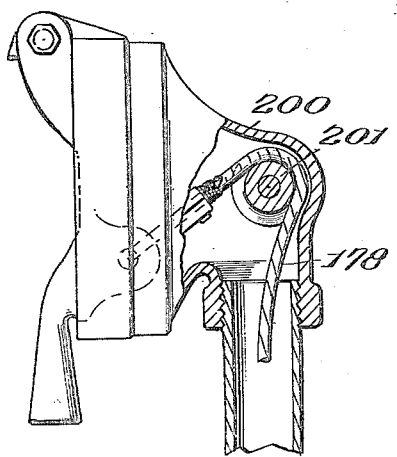

SELBY C. CARR, OF OKLAHOMA, OKLAHOMA.

AUTOMATIC CUT-OFF VALVE.

1,385,112. Specification of Letters Patent. Patented July 19, 1921.

Application filed May 7, 1918. Serial No. 233,104.

*To all whom it may concern:*

Be it known that I, SELBY C. CARR, a citizen of the United States, residing at Oklahoma city, in the county of Oklahoma and State of Oklahoma, have invented certain new and useful Improvements in Automatic Cut-Off Valves, of which the following is a specification.

This invention relates to automatic valves for employment in gas supply systems, the object of the invention being to provide a valve which will close automatically under abnormal pressure conditions in the system, which will close automatically upon rise of temperature above an abnormal degree as, for example, when a fire occurs in the vicinity of the valve, which may be closed manually at its point of location, and which may be closed manually from a distance, so that in either of the instances mentioned the supply of gas from the mains to the building in which the valve is located will or may be cut off to prevent accidents from causes and under conditions which will be presently fully made clear.

It happens at times that the pressure in the supply mains in an illuminating gas distributing system becomes materially reduced to such a degree that combustion is not supported at the burners within the building or buildings to which gas is supplied. This reduction in pressure may result from various causes, among which may be mentioned fracture of the conducting pipe or mains, congelation of water in the pipe or main, leakage in the system, and cessation of flow of the gas from its source of supply. Usually this reduction in pressure is only temporary and upon restoration of pressure to the normal degree there are very likely to be serious results. For example, when the pressure becomes lowered to such a degree that combustion is not supported at the burners and one or more burners are in use at the time, the flame or flames will be extinguished while the abnormally lowered degree of pressure maintains. As soon as this condition is remedied, however, by resumption of flow of the gas at the normal degree of pressure, the gas will, of course, escape from the burners which have become extinguished by the reduction in pressure, and as a consequence the room or rooms will become filled with gas and if a person through ignorance or unfamiliarity with the presence of the gas in great quantities in the room should attempt to light any of the burners an explosion will, of course, occur with serious results. Also in the use of gas distributing systems in which prepayment meters are employed, it sometimes happens that before a coin of the proper denomination can be obtained for insertion in the meter to continue the flow of gas when the supply delivered by the meter mechanism has become nearly exhausted, the gas has ceased to flow altogether and as a result such burners as are at that time in use become extinguished and then when a coin of proper denomination is inserted into the meter and the flow of gaseous fluid is resumed, the gas will escape from the burners which have been extinguished unless great care has been taken to go from room to room in the house or building for the purpose of turning off the burner valves so that where prepayment meters are used in such a system the same accident is likely to occur as in instances where the pressure in the main becomes greatly reduced from breakage of the mains, congelation of water therein, and the other causes heretofore mentioned. In consideration of the foregoing it is, therefore, one aim of the present invention to provide a valve of this class which may be installed in either a straight supply system or a system employing the prepayment meter and which valve will close automatically when the pressure in the mains or in the supply pipes leading to or from the meter, in the first and second instances respectively, becomes reduced to such degree that combustion is not supported at the burners, thereby preventing further flow of gas to the burners until normal pressure has been restored and the valve has been intentionally, and by an authorized person, reset to open position. In this connection the invention aims to so construct the mechanism of the valve that the pressure in the mains or supply pipes may vary within wide limits without the valve automatically closing so that annoyance will not be caused through closing of the valve while there is still sufficient pressure to support combustion at the burners, the valve mechanism being so adjusted as to provide for closing of the valve only when a desired predetermined abnormally low degree of pressure has been reached.

Not only are accidents liable to result from reduction of pressure in gas supply systems to an abnormal degree, but equally dangerous results may result from an increase in pressure to an abnormally high degree. For example, under some conditions the degree of pressure in the system might rise to such a degree as to cause bursting of one or more of the supply pipes in the building with the result that gas under very high pressure and in great volume would escape into the building through the fractures in the supply pipes and great damage would be caused the moment this gas became ignited, especially if the breakage of the supply pipe or pipes was not noticed for some length of time. The present invention, therefore, also aims to so construct the valve that the same will automatically close when the pressure in the supply system reaches an abnormally high degree so that when the pressure becomes abnormally high the supply to the interior of the building would be immediately automatically cut off thereby confining the high pressure to the mains exteriorly of the building. In this connection the invention also has as its object to so construct the valve closing mechanism that the same may be so adjusted as to close the valve at any desired predetermined abnormally high degree of pressure thereby providing for a continued supply of gas to the building under a pressure above normal and yet not sufficiently high to cause bursting of the supply pipes.

In gas supply systems there has heretofore always been a constant danger attending a fire in a building supplied with gas due to the fact that as the fire progresses the pipes or pipe connections are likely to become melted thereby admitting into the building a large volume of gaseous fluid to feed the flames and add to the danger which would be caused by the burning of the structure itself. There is also great danger to occupants trapped in a burning building and to firemen entering the building because of violent explosions which are likely to occur due to accumulation of large volumes of the gaseous fluid in one or more rooms of the building and being finally reached by the flames. It is not always by any means convenient for the firemen or policemen to locate the point at which the gas supply may be cut off from the mains to the building nor are tools for this purpose always at hand. Realizing the dangers attending a burning building supplied with gas and where no means is provided whereby the supply may be conveniently cut off from the mains to the building in the event of fire, numerous municipalities have passed laws requiring the installation in such buildings of means whereby the cutting off of the gas supply may be conveniently accomplished. The present invention, therefore, has as a further object to provide in connection with the valve embodying the present invention, means whereby the valve may be manually actuated from a distance to cause closing of the valve proper so that in the event of fire the firemen upon reaching the burning building may immediately cut off the supply of gas from the mains to the building without being required to enter the building. Incidentally the invention has as its object to so construct the mechanism of the valve that the provision of the means whereby the valve may be closed from a distance will not in any way interfere with the automatic operation of the valve in closing under abnormally low or abnormally high degrees of pressure.

Probably the greater number of fires in buildings have their origin in the cellar or basement of the building and inasmuch as gas meters and the connections between the supply mains and the pipes within the building are ordinarily located in the basement or cellar, the provision of thermostatic means at or adjacent the connections with the mains for the purpose of automatically cutting off the supply of gas in the event of fire in the vicinity of such connections, is highly desirable. The invention, therefore, further aims to provide in connection with the valve closing mechanism, means which will, when subjected to a predetermined high degree of temperature, release the mechanism for automatic actuation to close the valve. In connection with the provision of such means the invention aims to so construct and arrange the same that its presence will in no way affect the operation of the means provided for automatically closing the valve upon abnormal increase or decrease in the pressure in the system.

As before stated, the connection between the supply pipes within a building and the street mains is ordinarily located within the cellar or basement of the building and as the furnace room and janitor's quarters are also ordinarily located in the cellar or basement and he is usually among the first to be apprised of a fire in the building, it is desirable that some means be provided at or adjacent said connection whereby the supply of gas from the mains to the distributing pipes within the building may be conveniently and manually cut off and without the use of tools of any sort whatsoever. The present invention, therefore, has as a further object to provide means whereby the valve closing mechanism may be actuated manually at the valve for the purpose of closing the valve and cutting off the supply of gas to the building, this means being so arranged and constructed as not to in any way interfere with the automatic closing of the valve under abnormal pressure conditions or its closing automatically in the presence of great heat, or its manual closing from a distance.

Another aim of the invention is to so construct the valve and the various automatically and manually operable closing means embraced therein that the valve may be installed in any desired position without impairing the efficiency of any of said means.

The invention also has a further object to provide means for preventing resetting of the valve to open position, after it has been closed, by an authorized person until pressure has been restored in the system to a degree above the abnormally low degree at which the valve is adjusted to close automatically and below the abnormally high degree at which it is adjusted to close automatically.

The invention still further aims to so construct the valve as to prevent the escape of gas from the valve casing and prevent the entrance of moisture into the casing or its entrance into any parts housing working elements of the valve mechanism.

Further the invention has an object to provide means whereby access may be readily had to the valve closing mechanism located within the casing of the valve for the adjustment or repair of such parts or for inspection thereof.

The present invention is also designed as an improvement on the automatic cut-off valve disclosed in my Patent No. 1,247,638, issued November 27, 1917.

In the accompanying drawings:

Figure 1 is a perspective view illustrating the valve embodying the present invention installed in a gas supply system;

Fig. 2 is a vertical sectional view on the line 2—2 of Fig. 1, the valve being shown in normal or open position;

Fig. 3 is a similar view illustrating the position assumed by the parts upon closing of the valve under abnormally low pressure;

Fig. 4 is a view similar to Fig. 2 illustrating the positions assumed by the parts upon closing of the valve under an abnormally high degree of pressure;

Fig. 5 is a sectional view on the line 5—5 of Fig. 2 looking in the direction indicated by the arrows;

Fig. 6 is a sectional view on the line 6—6 of Fig. 2 looking in the direction indicated by the arrows;

Fig. 7 is a sectional view in detail on the line 7—7 of Fig. 5;

Fig. 8 is a sectional view on the line 8—8 of Fig. 6, in detail;

Fig. 9 is a group perspective view of several of the parts illustrated in Fig. 8;

Fig. 10 is a perspective view of a trip lever comprising an element of the valve closing mechanism;

Fig. 11 is a view in side elevation of the plunger member of the manually operable means for tripping the valve;

Fig. 12 is a vertical sectional view on the line 12—12 of Fig. 11, looking in the direction indicated by the arrows;

Fig. 13 is a similar view on the line 13—13 of Fig. 11 looking in the direction of the arrows;

Fig. 14 is a view partly in side elevation and partly in section illustrating the shaft with relation to which the plunger is slidable, and the elements associated with said shaft;

Fig. 15 is a vertical sectional view on the line 15—15 of Fig. 14;

Fig. 16 is a detail sectional view illustrating the relative positions of the trip and diaphragm levers when the valve is in open position;

Fig. 17 is a sectional view on the line 17—17 of Fig. 7 illustrating the positions of the parts of the local manually operable and thermostatic means for closing the valve when the valve is in open position;

Fig. 18 is a view similar to Fig. 17 illustrating the positions assumed by the trip and diaphragm levers as the valve is adjusted to open position;

Fig. 19 is a view similar to Fig. 17 illustrating the positions assumed by the local manually operable and thermostatic closing means as the valve is adjusted to open position;

Fig. 20 is a view similar to Fig. 16 illustrating the positions assumed by the diaphragm and trip levers when the valve closes under low pressure;

Fig. 21 is a view similar to Fig. 20 illustrating the positions of the trip and diaphragm levers when the valve closes under high pressure;

Fig. 22 is a view similar to Fig. 16 illustrating the positions assumed by the trip and diaphragm levers when the local manually operable means is actuated or when the distant manually operable means is actuated for closing the valve;

Fig. 23 is a view similar to Fig. 17 illustrating the positions assumed by the local manually operable and the thermostatic closing means when the local manually operable means is actuated;

Fig. 24 is a view similar to Fig. 16 illustrating the positions assumed by the trip and diaphragm levers when the thermostatic closing means has been actuated;

Fig. 25 is a view similar to Fig. 17 illustrating the positions assumed by the local manually operable and the thermostatic closing means when the thermostatic means has been actuated;

Fig. 26 is a group perspective view illustrating various elements of the valve resetting means;

Fig. 27 is a longitudinal sectional view, parts in elevation, illustrating the elements shown in Fig. 26, assembled;

Fig. 28 is a sectional view on the line 28—28 of Fig. 7, illustrating one form of seal which is provided to prevent resetting of the valve to open position except by an authorized person;

Fig. 29 is a perspective view of the lock for the seal;

Fig. 30 is a view similar to Fig. 28 illustrating a modified form of seal;

Fig. 31 is a sectional view on the line 31—31 of Fig. 2;

Fig. 32 is a vertical sectional view illustrating the means provided for closing the valve from a distance;

Fig. 33 is a vertical sectional view on the line 33—33 of Fig. 32 looking in the direction indicated by the arrows;

Fig. 34 is a view partly in side elevation and partly in vertical section illustrating a modified form of the distant closing means;

Fig. 35 is a top plan view of the structure shown in Fig. 34.

The valve embodying the present invention includes a casing which is indicated in general by the numeral 1 and this casing is provided at one end with an extension 2 which is interiorly threaded as indicated by the numeral 3 to provide for the connection with the casing of a gas supply pipe indicated in Fig. 1 of the drawings by the numeral 4, this pipe leading from the usual main indicated in the said figure by the numeral 5. At its opposite end the casing is formed with an extension 6 which is interiorly threaded as indicated by the numeral 7 for the connection with the casing of a pipe 8 which provides an outlet for the gas to be distributed. While in Fig. 1 of the drawings the pipe 4 leads from the main 5 to the valve casing and the pipe 8 leads to the meter which is indicated by the numeral 9, it will be understood that in the instance of a system in which there is installed a prepayment meter, the pipe 4 may lead from the meter to the valve and the pipe 8 will have connected with it the various distributing pipes leading to the burners. In other words, where the valve is to be employed in a system in which the ordinary type of meter is installed, the valve may be located between the main and the meter whereas when the valve is employed in a system using a prepayment meter, it is preferable that the valve be installed at a point between the meter and the distributing pipes, although it may be installed between the main and the meter if found advisable. Also as before stated the valve may be installed in any desired position without in any way affecting the operation thereof. At one side the valve casing 1 is formed with a dome-like extension 10 which is circular at its open side or end and which is closed by means of a cap as will be presently described. Interiorly the valve casing 1 is formed with an integral arcuate partition wall 11 which serves to divide the interior of the casing into a main chamber 12 and a valve chamber 13 in which latter the valve proper is housed in a manner to be presently set forth. By reference to Fig. 2 of the drawings it will be observed that the inlet and outlet extensions 2 and 6 respectively are in axial alinement and also by reference to this figure and to Fig. 31 it will be observed that the partition wall 11 is concentric to the axis of the said inlet and outlet extensions. It will also be observed by reference to this figure that the walls of the casing 1 to each side of the partition wall 11 are outwardly bulged as indicated by the numeral 14 and that the bulged wall 14 is also concentric to the axis of the inlet and outlet extensions and that, therefore, this axis is also the axis of the valve chamber 13 as a whole. The inlet end of the valve chamber 13 communicates with the inner end of the inlet extension 2 and the outlet end of the said valve chamber is defined by an annular beveled valve seat 15 concentric to the axis of the said chamber 13 and that the diameter is approximately equal to the interior diameter of the inlet passage defined by the extension 2. Ribs 16 are formed integrally with the inner surface of the wall 11 at the opposite side thereof and project radially inwardly and extend longitudinally the entire length of the valve chamber 13 and similar ribs 17 are formed integrally with the inner surface of the bulged wall 14 and project inwardly radially therefrom and also extend longitudinally the entire length of the said valve chamber. The inner edges of all of the ribs 16 and 17 are smoothly finished and touch an imaginary cylindrical surface concentric to the axis of the valve chamber, the said edges conforming to such surface and merging with the inner surface of the inlet extension 2. The valve proper is indicated in general by the numeral 18 and the same comprises a closed head 19 having a peripheral bevel 20 designed to seat snugly within the valve seat 15 when the valve is in closed position. The valve body is hollow as clearly shown in Figs. 2 and 31 of the drawings, the said body being substantially cylindrical exteriorly and being interiorly slightly flared or increased in diameter toward its end opposite the end at which the head 19 is located. The wall of the valve body is formed at suitable intervals in its circumference with passages 21 which extend substantially the entire length of the wall and throughout the major portion of the area thereof whereby to provide for the free and unrestricted passage of gas past the valve. Exteriorly the valve body is formed near its forward and at its rear end with angular flanges 22 and 23 respectively, the outer edges of which flanges are smoothly finished so as to snugly and yet freely slide along the inner edges of the ribs 16 and 17 as clearly shown in Fig. 31 of the drawings. It will now be understood that the valve is guided in its opening and closing movements by the said ribs 16 and 17 and that due to the passages 21 provided in the wall of the valve body and to the bulge 14 formed in the wall of the valve chamber, gas may readily flow around the valve when the valve is in open position, and in fact the area of the passages provided for the gas is sufficiently great to compensate for the friction attending the flow of gas past the valve. By reference to Figs. 2, 3 and 4 of the drawings it will be noted that the valve 18 closes with the pressure and in order to firmly hold the valve to its seat when the valve is in closed position so as to positively prevent any passage of gas into the chamber 12 from the valve chamber 13, there is provided a spiral spring 24 the smaller end of which enters the interior of the hollow valve body and bears against the inner side of the head 19. The major end of this spring enters the inlet extension 2 and rests against a ring 25 which is exteriorly threaded to engage the threads 3 of the said extension, the ring being provided upon its inner side with spaced lugs 26 for engagement by a spanner wrench or the like whereby to adjust it longitudinally within the extension 2 for the purpose of varying the tension of the spring 24, thereby increasing or diminishing the force with which this spring acts against the valve 18 tending to move the said valve to its seat. Thus by adjusting the ring 25, the valve 18 may be caused to close with a greater or less degree of force as desired. It will also be understood that by removing the ring 25 from the extension 2 and removing the spring 24, the valve may be readily removed from the valve casing after disconnection from the operating mechanism connected with it.

At the inner end of its outlet extension 6, the valve casing is formed with a lateral extension 27 upon its outer side and has its wall at this point increased in thickness to provide an inward extension or boss 28. The extension 27 has a bore 29 which is threaded at its inner end as indicated by the numeral 30 and the boss 28 is formed with an opening 31 which communicates with the inner end of the bore 29 and at or adjacent its point of communication with the said bore is flared in the direction thereof as indicated by the numeral 32 so as to form a conical seat for a purpose to be presently explained, this seat being smoothly ground or finished. The numeral 33 indicates a short shaft which is rotatably fitted within the opening 31 and which is formed with an integral conical plug portion 34 which rotatably fits within the flared portion 32 of the said opening in a gas tight manner, and being held in such position, serves to prevent escape of gas from the valve casing through the said opening 31. The formation of the plug portion 34 results in a shoulder 35 which is located within the inner end of the bore 29, the plug portion 34 being of a length greater than the length of the conical portion 32 of the opening 31. Beyond the shoulder 35, the shaft 33 is preferably slightly reduced in diameter as indicated by the numeral 36, this reduced portion also being located within the bore 29 and axially thereof as shown in Fig. 7 of the drawings. A collar 37 is formed axially with an opening 38 through which the reduced portion 36 of the shaft 33 rotatably fits and this collar is disposed upon the said reduced portion of the shaft with one face of the collar resting against the shoulder 35. In order to prevent rotation of the collar 37 it is formed in its outer periphery with a notch 39 in which seats the inner end of a pin 40 which is inserted through the extension 29 and is permanently secured in place as, for example, by riveting. Also fitted onto the reduced end of the said shaft is a packing washer 41 of wood fiber or any other compressible material suitable for the purpose and preferably compressible. A bushing 42 preferably of cylindrical form is provided exteriorly with threads 43 to fit the threads 30 of the extension 29, the bushing having oppositely located notches 44 whereby it may be engaged by a spanner wrench and tightly threaded into place as shown in Fig. 7 of the drawings with its inner end bearing firmly against the peripheral portion of the washer 41 and forcing the same snugly against the collar 37. In this manner the shaft 33 is at all times held in such position that its plug portion 34 will seat snugly and in a gas tight manner in the conical portion 32 of the opening 31. The washer 41 serves as a cushion for the shaft 33, permitting the shaft to turn easily. As will be presently explained the shaft 33 is to be rotated through the medium of a suitable hand wrench for the purpose of setting or adjusting the valve to open position and in order that rotation of the shaft 33 in a proper direction will serve to accomplish this result, operable connection is provided between the shaft and the valve as will now be described. The numeral 45 indicates in general an arm which preferably intermediate its ends is turned at an angle so as to provide a portion 46 and a portion 47 which portions extend at an obtuse angle with relation to each other and are relatively off-set as clearly shown in Fig. 6 of the drawings, the bend between the said portions being indicated by the numeral 48 and taking not only a lateral direction but also a direction at right angles thereto. The end of the portion 46 of the arm 45 is formed with an opening 49 of such diameter as to adapt the arm to be freely pivotally mounted upon the shaft 33 as clearly shown in Fig. 7 of the drawings, the said end of the arm 45 resting at the inner end of the boss 28. The numeral 50 indicates a threaded stud which is fitted into the inner end of the shaft 33 immediately inwardly of the said end of the arm 45, and threaded into the portion 46 of the arm is a stud 51 which is located in the path of movement of the stud 50 upon rotation of the shaft 33. Thus it will be apparent and particularly by reference to Figs. 2, 3 and 4 of the drawings that when the shaft 33 is rotated toward the inlet end of the valve casing, the stud 50 is brought into engagement against the stud 51 upon the arm 45 and the said arm will be swung upon its pivot, or, in other words, about the shaft 33 in the corresponding direction. Thus while the shaft 33 is rotatable independently of the arm 45 and the said arm is in like manner movable independently of the shaft the arm may be swung upon rotation of the said shaft in one direction. A thrust link 52 is pivotally connected at one end as at 53 with the arm 45 at the bend 48 therein and at its other end this link is pivotally connected to a lug 54 upon the outer surface of the head 19 of the valve 18. In providing this and other pivotal connections to be presently referred to, it is preferable that a pivot of the form shown in Fig. 7 of the drawings be provided. In this figure the numeral 55 indicates a pivoted pin provided at one end of its short shank with a head 56 the head bearing against one side of the thrust link 52 and the shank 55 fitting through an opening 57 formed in the last mentioned end of the said link. The shank 55 at its end opposite the end at which the head is located is reduced in diameter as indicated by the numeral 58 thus forming a shoulder 59. The reduced portion 58 of the shank is fitted through an opening in the lug 54 and is riveted at its end as at 60 so that while the shoulder 59 bears firmly against one side of the lug 54 and the pivot pin is in this manner firmly anchored to the lug, the end of the thrust link 52 is free to move about the pivot so that there will be as little friction as possible between these parts. In order to limit the thrust of the arm 45, an abutment screw 61 is threaded adjustably through the portion 47 of the said arm 45 and has a projecting portion 62 designed to strike against the inner surface of the valve casing when the arm 45 has assumed a predetermined position. It will now be understood that when the shaft 33 is rotated so as to bring the stud 50 into engagement with the stud 51 and rotation of the shaft is continued, the link 52 will be caused to exert a thrust against the valve 18 moving the said valve to open position against the tension of the spring 24. Movement of the parts, however, is arrested as soon as the valve has reached full open position due to the engagement of the end 62 of the abutment screw 61 against the wall of the valve casing and the parts cannot be moved beyond a dead center or, in other words, to such an extent that the axis of the pivot 33 would pass a straight line drawn through the axis of the pivots 33 and 55. It will also be apparent that when the valve has been moved to this position, the spring 24 will act against the valve tending to seat the same and the force of the spring will be transmitted through the thrust link 52 to the arm 45 tending to swing this arm in the direction of the outlet end 6 of the casing or, in other words, in a direction opposite to that in which it was swung through rotation of the shaft 33. The force thus exerted by the spring, however, is counteracted by reason of the interposition of a system of levers between the arm 45 and a pressure actuated element within the dome of the valve casing such, for example, as a collapsible diaphragm, and this system of levers will now be described.

One side wall of the casing for the valve is formed with a threaded opening 63 located between the inner end of the valve chamber 13 and the outlet 6 from the casing and threaded into this opening is the reduced threaded end 66 of the shank 67 of a pivot screw 68, the shoulder formed by reducing the said shank bearing against the inner face of the wall of the casing as clearly shown in Fig. 6 of the drawings and the said shank of the screw 68 except for its reduced portion being cylindrical and smooth whereby to provide a pivot for the hub of an angle lever 69 which lever is clearly shown in Fig. 10 of the drawings. This lever will hereinafter be referred to as a trip lever and the same comprises relatively angularly extending arms 70 and 71. A link 72 is pivotally connected at one end to the end of the portion 47 of the arm 45 and at its other end is pivotally connected to the arm 70 of the trip lever. The arm 71 of this lever is formed at its end and at one side with a laterally projecting lug 73 having a beveled surface 74 and a beveled surface 75. These surfaces will hereinafter be referred to respectively, as a primary bevel and a secondary bevel, the two bevels occupying planes at acute angles to each other as clearly shown in Figs. 2, 3 and 4 and the said Fig. 10. That side wall of the casing for the valve opposite the wall which is provided with the extension 27, is formed with an outward extension 76 and an inner extension 77, these extensions being formed with a common bore 78. At the inner end of the inner extension 77, the bore 78 is reduced in diameter and interiorly threaded as indicated by the numeral 79 and fitted therein is a bushing 80 having a head 81 which bears against the shoulder formed by reducing the said bore. The bushing 80 has an opening 82 formed therein which opening is cylindrical throughout that portion of its length which is located within the head 81 but is flared to conical form, as indicated by the numeral 83, throughout the remainder of its length, the flared portion constituting a seat as will be presently pointed out. The end of the bushing 80 is formed at opposite points with notches or sockets 84 for the engagement of a spanner wrench whereby the bushing may be threaded into place. The head 81 of the bushing 80 is formed with an annular bevel 80' designed to seat in a gas-tight manner against a similar bevel 81' surrounding the inner end of the bore 78. A shaft indicated in general by the numeral 86 is rotatably fitted within the opening 82 and is formed with an integral conical plug portion 87 which is smoothly finished to snugly fit within the portion 83 of the opening 82 in a gas-tight manner. The plug portion 87 is located near the inner end of the shaft 86, and secured in any suitable manner upon this end of the shaft immediately inwardly of the extension 77, as, for example, by means of a pin or screw 88, is a short arm 89. At its outer end this arm 89 is formed with an opening 90 into which is fitted and secured one end of a pivot pin 91. Loosely mounted for rocking movement upon this pivot pin is the hub of an angle lever 92 which lever will hereinafter be referred to as the diaphragm lever. The lever 92 comprises a relatively long tapering arm 93 which extends from the head 80 obliquely lateral and is thence bent as at 94 to extend directly forwardly as at 95, the portion 95 extending parallel to the longitudinal median line of the valve casing as a whole and opposite the wall 11 of the valve chamber 13, the lever 92 being located within the dome 10 of the valve casing as clearly shown in Figs. 2, 3 and 4 of the drawings. The other arm of the diaphragm lever is indicated by the numeral 96 and extends slightly at an obtuse angle to the arm 93 and the said arm 96 is slotted as indicated by the numeral 97 to receive a small plate 98 preferably of phosphor bronze or other hardened material which plate at one edge is provided with an extension 99 constituting a wiper for co-action with the lug 73. The wiper in cross-section has the form of a parallelogram and the beveled end surfaces thereof are indicated one by the numeral 100 and the other by the numeral 101. In the description which is to follow the bevel 100 will be termed the primary bevel and the bevel 101 will be termed the secondary bevel, these bevels co-acting respectively with the primary and secondary bevels 74 and 75 of the lug 73. While the arm 89 is fixed for movement with the shaft 86, means is provided which will be presently described, for normally holding this shaft in a predetermined fixed position and, therefore, the pivot 91 is normally a stationary pivot upon which the lever 92 may rock. As will now be described, the end 95 of the diaphragm lever arm coöperates with the diaphragm heretofore mentioned.

As before stated, the open side of the dome 10 is circular in form and the same is formed with an angular rabbet or depressed shoulder 102 upon which is disposed the periphery portion of a flexible diaphragm 103. The diaphragm 103 may be of leather, a gas-proof fabric, or in fact any material sufficiently flexible for the purpose and either in itself impervious to gas or treated so as to render it so. Furthermore, the material of which the diaphragm is formed may be treated with any suitable composition to counteract the deteriorating effects of the corrosive constituents of the gas. The diaphragm 103 is not stretched taut when placed in position but is relatively loose as will be apparent by reference to Fig. 2 of the drawings and the said peripheral portion of the diaphragm is firmly clamped by the engagement therewith of an annular shoulder 104 formed upon the inner face of a cap 105 which closes the said open side of the dome and which is secured in place by means of suitable bolts 106 fitted through lugs 107 formed upon the cap and threaded into lugs 108 located at suitable intervals about the open side or end of the dome. The openings in the lugs 107 through which the bolts are fitted are indicated by the numeral 109 and are of a diameter slightly greater than the diameter of the bolts so that an air space is left surrounding each bolt. Through each lug 107 and traversing the opening 109 and also extending through the peripheral portion of the cap 105 there is formed a small air passage 110 which communicates with the space between the inner side of the cap and the diaphragm 103 whereby to permit of the entrance and exhaust of air into and from said space and thereby permit of distention and collapse of the said diaphragm. Also for the purpose of admitting air into the passages 110, it is preferable that the inner sides of the lugs 107 be spaced as indicated by the numeral 111 from the outer faces of the lugs 108, the spaces 111 communicating with the openings 109 and by way of these openings with the air passages 110. Disposed against that side of the diaphragm 103, at the central portion thereof, which is presented toward the cap 105 for the dome, is a reinforcing disk 112 of aluminum or any other suitable light and strong material possessing the desired degree of stiffness, and threaded through the said center portion of the said diaphragm 103 and into the said disk 112 is the threaded shank 113 of a yoke 114, the shank of the yoke being provided with a disk like head 115 which bears against the other face of the diaphragm and thus opposes the disk 112, not only firmly anchoring the yoke to the diaphragm but also providing against the escape of gas through the opening in the diaphragm. The opening in the yoke 114 is sufficiently large to loosely receive the end 95 of the diaphragm lever in the manner clearly shown in Fig. 4 of the drawings. It will now be understood that when gas under pressure is admitted into the valve casing the fluid will act against the diaphragm 103 tending to distend the same in an outward direction and in order to limit such distention and cause the diaphragm, under normal pressure in the casing, to occupy about the position shown in Fig. 2 of the drawings, there is provided an auxiliary diaphragm indicated in general by the numeral 116. This auxiliary diaphragm is clearly illustrated in Fig. 5 of the drawings and the same is formed from some light sheet metal possessing the desired degree of resiliency and as a whole is circular in contour and normally flat sided as shown in Figs. 2 and 3. The diaphragm is formed with a number of slits 117 which extend radially from the periphery thereof to points suitably spaced from the center of the diaphragm, the slits being gradually widened from their inner ends to their outer ends so as to provide a number of segments 118 integrally connected at their inner ends with the central portion of the diaphragm and permitting of the diaphragm being pressed outwardly into the cap 110 under abnormally high degrees of pressure as shown in Fig. 4 of the drawings. Connected with the outer side of the diaphragm 116 at the central portion thereof is the inner end of a pin 119, the outer end of which pin fits slidably within an opening 120 formed axially in a bushing 121 which bushing is exteriorly threaded and is fitted within the inner end of a tubular extension 122 formed upon the outer side of the cap 105 at the central portion thereof and closed at its outer end. The bushing is preferably provided with a head 123 designed for the application of a wrench or other suitable tool whereby the bushing may be threaded into place, this head being received within a recess 124 formed in the inner surface of the cap 105 and surrounding the opening in the tubular extension 122 so that when the diaphragm 116 is bulged outwardly as shown in Fig. 4 of the drawings, its movement in such direction will not be unnecessarily restricted. The wall of the opening 120 in the bushing 121 is formed with a longitudinally extending groove 125 and the inner end of the pin 119 has a lateral stud 126 adapted to pass through the groove 125 when the outer end of the pin 119 is properly positioned at the inner end of the opening 120 in the said bushing. When unrestrained, the diaphragm 116 bulges slightly in a direction opposite the direction in which it is bulged in Fig. 4 and consequently, inasmuch as its periphery rests against the inner face of the cap 105, when the outer end of the pin 119 is caused to enter the opening 120 until the stud 126 has passed through the groove 125, the diaphragm will have been placed under a certain degree of tension. When the pin 119 has been inserted in the manner stated, the diaphragm may be given a half turn whereby to bring the stud 126 out of registration with the groove 125 and at such time the diaphragm will be held under tension in substantially the flat form shown in Figs. 2 and 3 although it may at any time be conveniently removed when desired. For a purpose which will be presently made clear, the pull exerted upon the diaphragm 116 through the pin 119 and the fixed engagement of this pin with the bushing 121, is slightly less than the force which would be exerted in the corresponding direction against the diaphragm by gas within the valve casing under a normal degree of pressure. Before entering into a full explanation of the manner in which the trip and diaphragm levers coact and the manner in which the diaphragm is affected by abnormally low and high degrees of pressure within the valve casing, I will first describe the devices which are associated with the shaft 86 and which comprises the means whereby the valve may be released for closing movement by rise in temperature, or manually at the point of location of the valve, or manually from a distance. At the present time it will suffice to say that when the valve is in the open position shown in Fig. 2 of the drawings, the secondary bevel 101 of the wiper 99 will ride against the secondary bevel 75 of the lug 73 so that gas under normal pressure in the valve casing acting against the diaphragm 13 to hold the said diaphragm in the position shown in Fig. 2, the diaphragm lever will be held also in the position shown in said figure and thus the force exerted by the spring 24 and communicated through the thrust link 52, arm 45, and link 72 to the trip lever will be counteracted or equalized so long as the pressure remains substantially normal.

Fitted upon the shaft 86 is a spring 127 which is of the compression type and designed also to be subjected to torsional stress and this spring has one extremity bent at an angle as indicated by the numeral 128 and other extremity bent at an angle as indicated by the numeral 129. For a reason to be presently explained, when the shaft 86 is rotated in one direction, such rotation will be against the tension of the spring 127 and when the shaft is released it will be returned to its normal position by the said spring. This rotation of the shaft 86 may be accomplished manually at the point of location of the valve or from a distance through the actuation of a member which is slidably mounted within the bore 78 of the extensions 76 and 77. The local manually operable means for rotating the shaft 86 embodies also the thermostatic means providing for automatic actuation of the valve in the event of fire in the vicinity of the valve and this means includes a collar 131, the opening in which is tapered and is indicated by the numeral 132, the collar being rotatably fitted upon the extension 76 and the said extension being exteriorly tapered as indicated by the numeral 133 to correspond to the taper of the opening in the collar so that when the collar is in position against a shoulder 134 formed at the inner end of the extension 76, the wall of the opening 132 will snugly fit the said extension 76 whereby to prevent the entrance of moisture into the collar and into the bore 78 in the said extension and the extension 77, the collar being normally held against the said shoulder by means which will be presently described and the contacting faces of the collar and shoulder being smoothly ground or finished so as to provide for a snug engagement of these parts. Throughout nearly one-half of its circumference, the collar is circumferentially bulged as indicated by the numeral 135 and this bulged portion is formed interiorly with a correspondingly extending groove 136 the side walls of this groove being parallel except at one end of the groove at which point that wall of the groove which is located next adjacent the shoulder 134, is inclined inwardly at an angle as at 137. The numeral 138 indicates the threaded shank of a screw which is fitted through one side of the extension 76, the head 139 of this screw being located within the groove 136, normally substantially midway between the side walls of the groove. For a purpose to be presently explained the shank of the screw is reduced at its inner end as indicated by the numeral 140. Through the instrumentality of the spring 127 and the torsional action thereof tending to rotate the shaft 86 toward the left in Fig. 17 and the other corresponding figures of the drawings, and through certain connections to be presently described, between the said shaft and the collar tending to rotate the collar in the same direction, the inclined wall 137 of the groove 136 normally engages the head 139 of the screw 138 and as a consequence the collar is wedged or forced toward the right in Fig. 8 of the drawings so that its inner face will rest firmly against the shoulder 134 as before stated. Thus not only does the head of the screw serve as a stop to limit the rotative movement of the collar toward the left in Fig. 17 and the corresponding figures of the drawings, but it serves also, by reason of its contact with the inclined wall 137 of the groove, to hold the collar in such position that the wall of the opening 132 therein will normally fit snugly upon the major end of the tapered extension 76, the inner face of the collar seating, as before stated, against the shoulder 134. A pin 141 is provided with a threaded shank 142, which is threaded through an opening 140$^a$ formed radially in a collar 140$^b$, which collar is fitted onto the shaft 86, the inner end of the threaded shank of the pin being threaded into the said shaft, thus not only securing the pin for turning movement with the shaft, but also securing the collar 140$^b$ to the shaft. At this point it will be noted that the collar 140$^b$ is formed in its face which is presented toward the bushing 80 with an annular groove 141$^a$ and with a diagonally extending opening or socket 141$^b$, and the said groove 141$^a$ serves as a seat for the corresponding end of the spring 127, the angularly extending terminal 129 of the said spring being snugly fitted into the opening or socket 141$^b$ so that in this manner the spring is provided at one end with an abutment which is fixed upon the shaft 86 and is also connected fixedly at its said end with the shaft so as to be subjected to torsional stress as the shaft is turned in one direction. The manner in which the other end of the spring is seated will be presently fully pointed out. Engaged with the hook 143 is an eye 144 at one end of a threaded stem 145 which stem is adjustably threaded into a sleeve 146 which at its outer end is of tapered conical form as indicated by the numeral 147 and is beyond this portion reduced as at 148. The stem 145 and sleeve 146 constitute the relatively adjustable sections of a thrust member indicated in general by the numeral 149, the sections being held at adjustment by a lock nut threaded onto the stem and bearing against the end of the sleeve, and this member constituting a part of the thermostatic means heretofore referred to. This thermostatic means also includes a plug 150 which is exteriorly threaded at one end as at 151 and fitted into an opening 152 formed in the side of the collar 131 at that end of the groove 136 opposite the end at which the inclined wall 137 is located. The plug 150 is provided outwardly of the threaded portion 151 with a polygonal portion 153 whereby a wrench may be engaged with the plug for the purpose of applying the same to the collar and removing the same therefrom when it becomes necessary to replace the plug. The plug is formed interiorly with a bore 154 which is tapered from end to end and which has its major end located at the inner end of the plug and its minor end opening through the outer end of the plug. The last mentioned end of the bore 154 corresponds in its taper to the tapered portion 147 of the sleeve 146 and is of such dimensions as to snugly receive this portion of the sleeve in the position of the parts shown in Fig. 25 of the drawings. Outwardly beyond the polygonal portion of the plug 153 the plug is exteriorly conical form and is formed with a circumscribing groove 155 and fitted on to the outer end of the plug is a cap indicated in general by the numeral 156, the cap having a closed end or head 157 and a cylindrical wall 158 which latter is formed at its circumference with a number of openings 159 designed, when the cap is fitted onto the said end of the plug, to communicate with the groove 155. When the cap has been so disposed in place, a molten composition of metals, preferably lead, bismuth, cadmium, and block tin, in suitable proportions, is poured into the openings 158 in the cap 156 and permitted to flow into the groove 155 in the plug 150 so that upon cooling small plugs 160ª of the metal composition will securely connect the cap with the plug 150 and hold the same against accidental disengagement therefrom. By reference now to Fig. 17 of the drawings it will be observed that normally the reduced end 148 of the sleeve 146 of the thrust member 149 seats within the minor end of the bore 154 and bears against that portion of the head 157 of the cap 156 which closes this end of the said bore, the cap constituting an abutment portion. Thus while the torsional stress exerted by the spring 137 upon the shaft 86 tends to rotate this shaft to the position shown in Fig. 25 of the drawings, the shaft is restrained against such movement due to the engagement of the end of the thrust member 149 against the cap 156 and the connection of the said thrust member at its inner end with the pin 141 upon the said shaft. However, the metallic composition forming the connecting plugs 160ª is of such nature that it will fuse or melt at an abnormally high temperature, preferably at about a temperature of one hundred and sixty degrees Fahrenheit, so that in the event of fire in the vicinity of the valve these plugs will melt and the cap 156 will cease to be held connected with the plug 150. At such time, of course, the thrust exerted by the member 149 will force the cap off from the plug and the thrust member 149 will move directly to the left in Fig. 17 and as shown in Fig. 25 of the drawings thereby permitting the shaft 86 to turn in a corresponding direction under the influence of the spring 127, the conical portion 147 of the sleeve section 146 of the said thrust member seating snugly within the minor end of the bore 154 so as to not only arrest the movement of the member in the direction stated but also close the bore and prevent entrance of moisture into the collar 131, and also, by the protrusion of the end 148 of the said thrust member, indicate the fact that the valve has been thermostatically actuated. The effect of such rotation of the shaft 86 upon the system of levers within the valve casing will be fully explained in the description of operation of the valve which will be given hereinafter. As before stated, the collar 131 is rotatable upon the extension 76 and it will be readily understood by reference to Figs. 17 and 23 of the drawings that when the collar is manually rotated toward the right in these figures the thrust member 149 will be moved in a corresponding direction and, acting against the pin 141, will rotate the shaft 86 toward the right and, as will also be set forth in the description of operation of the valve, this will result in the valve being released for closing movement.

The means provided whereby the valve may be manually released from a distance includes a plunger indicated in general by the numeral 160 and this plunger comprises a head 161 which is exteriorly cylindrical and is formed with a circumscribing rib 161' which fits snugly and yet slidably within the bore 78 in the extension 76 as clearly shown in Fig. 8 of the drawings. The head 161 is hollow and formed in its opposite sides with openings 161ª, and at that end which is presented toward the inner end of the bore or, in other words, that end which is presented toward the bushing 80, the head is closed except for an opening 161ᵇ of greater diameter than the shaft 86 and receiving the said shaft. Surrounding the opening 161ᵇ, the said end of the head is formed upon its inner side with an annular shoulder 162ª which constitutes a seat for the corresponding end of the spring 127 the said end of the head being further formed with an opening or socket 162ᵇ in which the terminal 128 of the spring 127 is engaged. At this point it will be understood that, as the spring 127 bears at one end against the head of the plunger and at its other end against the collar 140ᵇ, the conical portion 87 of the shaft 86 will be caused to seat in a gas-tight manner in the seat 83. The other end of the head is closed as indicated by the numeral 162 and is formed with an axially alined stem 163 provided at its outer end with an apertured ear 164. The wall of the head 161 is formed with a slot 165 which extends longitudinally of the said head, the slot being parallel to the axis of the head. To one side of the slot 165 the wall of the head is also formed with a substantially triangular opening 166 having a wall 167 which is parallel to the slot 165 and consequently parallel to the axis of the said head; a wall 168 which occupies a plane at right angles to the axis of the head and lies parallel and close to the closed end 162 of the said head, and, a wall 169 which extends between the remote ends of the wall 167 and 168 and consequently diagonally of the wall of the said head, this latter wall 169 forming an inclined cam surface for co-action with the pin 141 in a manner which will be presently explained. It will be observed that the rib 161' for a portion of its extent follows the wall 169 so that a broad bearing surface is provided for engagement with the said pin 141. By referring now to Fig. 17 and the corresponding figures of the drawings, it will be observed that the reduced inner end 140 of the screw 139 seats within the slot 165 in the head 161 and it will be understood that this end of the said screw, by engagement with the end walls of the said slot, serves to limit the sliding movement of the plunger head 161 within the bore 78, and by reason of its engagement with the side walls of the said slot, serves to prevent rotation of the plunger within the said bore. As clearly illustrated in Fig. 8 of the drawings, the stem 163 of the plunger 160 is formed with a bore which extends part way of the length thereof and opens into the head 161, this bore being indicated by the numeral 170 and being designed to receive the outer end of the shaft 86 so that the said shaft at this said end is afforded additional support without interfering with the sliding movement of the plunger within the bore 78. It will now be apparent that the spring 127 serves also as a means for holding the plunger normally at the inward limit of its movement. By reference to Fig. 8 it will be observed that the outer end of the stem 163 of the plunger fits slidably through the reduced end of the bore 173 of a coupling 174 so that the ear 164 upon the said stem is located exteriorly of the coupling to provide for the ready attachment thereto of a cable or similar pull element whereby the plunger may be slid outwardly against the tension of the said spring 171. The coupling 174 is threaded at one end into the extension 76. Between its ends the coupling 174 is provided with a polygonal portion 176 for the application of a wrench and the outer end of the coupling is taper-threaded as indicated by the numeral 177.

The flexible pull element above mentioned comprises a part of the means provided for releasing the valve for closing movement from a distance and this means will now be fully described. The numeral 178 indicates the pull element referred to which is preferably in the nature of a thin and yet very strong and flexible cable as, for example, phosphor bronze and this cable is looped at one end through the ear 164 as indicated by the numeral 179, a clamp 180 being applied to the looped end of the cable to secure the same and the cable being also preferably wrapped with wire as at 181 to prevent unraveling. This cable is to be led through one or more pipes to a pull box which is located at some convenient point preferably exteriorly of the building and in order that access may be conveniently had to the apertured end of the stem 163 for the connection of the cable 178 therewith and without disturbing the arrangement of the pipes through which the cable passes, after these pipes have once been placed in position, there is provided a telescopic connection between the valve device and the adjacent end of the pipe line as will now be explained. The telescopic connection comprises a member 182 in the nature of a short length of pipe which is interiorly taper-threaded at one end as indicated by the numeral 183 adapting it to be securely threaded on to the end 177 of the connection 174. At its other end the member 182 is interiorly reduced in diameter as indicated by the numeral 183 to form a shoulder which is beveled as indicated by the numeral 184. The other member of the connection comprises a length of pipe 185 which at one end is exteriorly slightly increased in diameter as at 186 so as to slidably fit within the bore of the member 182, the increase in diameter of the said member 185 providing a shoulder 187 which is beveled so as to snugly fit against the shoulder 184 when the members 182 and 185 are relatively extended as shown in Fig. 8. Inwardly of the shoulder 187 the member 185 is exteriorly threaded as indicated at 188 for the application thereto of a nut 189 which may be tightened to bear against the outer end of the member 182 as shown in the said Fig. 8 and thereby draw the shoulder 187 into firm contact with the shoulder 184. The member 185 is also exteriorly threaded as at 190 at its outer end so as to be adapted to be fitted into one end of an elbow 191 as clearly shown in Figs. 1 and 32 of the drawings. It will be understood that the cable 178 is led through the sections 182 and 185 of the telescopic connection above described, and as shown in Fig. 32 the cable is also led beneath a pulley 192 suitably mounted within the elbow 191 so that the cable may be led through a suitable length of pipe 193 connected at its lower end with the other end of the elbow 191 as indicated at 194. The upper end of the pipe 193 is threaded into the lower end of an elbow 195 which corresponds to the elbow 191 and within which there is also mounted a pulley 196 corresponding to the pulley 192 and over which the cable 178 is passed, the cable being then led through a length of pipe 197 one end of which is fitted into the other end of the elbow 195 and the other end of which communicates with the interior of the pull box shown in Figs. 32 and 33 of the drawings. The pipe arrangement just described is one suitable for employment under the conditions illustrated in Fig. 1 of the drawings and where the valve is located within the basement or cellar and the pull box is located upon the exterior of the building a suitable distance above the ground surface and it will be understood that the pipe arrangement will vary according to the relative points of location of the valve and pull box so that the arrangement herein described is merely one of many which may be found suitable for the purpose. In all essential features the two types of pull box shown in Figs. 32 and 33 and Figs. 34 and 35 are identical, the pull box shown in Figs. 34 and 35 being employed where there is substantially a direct connection between the box end of the cable and the valve device. In the several figures referred to the box is illustrated as comprising a suitable casing 198 which in Fig. 32 has a tapered hollow extension 199 into which the end of the pipe section 197 is fitted, and in Fig. 34 is provided with a similar extension 200 of elbow formation and within which is arranged a pulley 201 for the passage thereover of the cable 178. The casing of the box is open at its front as indicated by the numeral 202 and interiorly a short distance inwardly of its open side the said casing is formed with an angular flange 203 the inner face of which is preferably beveled as indicated by the numeral 204. A pintle lug 205 is formed integrally with the outer side of the casing 198 and projects beyond the open front thereof and is formed at its forward side with a transverse lip 206 for a purpose to be presently explained. The door of the box is indicated in general by the numeral 207 and is provided at its upper side with spaced pintle lugs 208 which straddle the lug 205, a pintle pin or bolt 209 being fitted through all of the said lugs whereby to hingedly connect the door with the outer side of the door opening within the casing, the outward swinging movement of the door being limited by the engagement of the outer face thereof against the lip 206 above mentioned. The inner face of the door 207 is rabbeted at its periphery as at 210 to provide for a snug fitting of the door against the flange 203 and so as to keep moisture from the interior of the box or casing. At its lower side the door 207 is provided with a handle 211 which may be grasped for the purpose of swinging the door to open position upon its hinge. At its lower side and upon its said inner face the door is formed with an integral boss 212 apertured as at 213 for the connection thereto of the box end of the cable 178 as clearly shown in Figs. 32 and 34 and in the manner described in connection with that end of the cable which is secured to the plunger stem 163. The boss 212 is formed immediately rearwardly of the inner face of the door 207 with a vertically extending slot 214 which opens through both the upper and lower sides of the boss, the lower end of this slot being located immediately above the lower side of the flange 203 and opposite and above the bevel 204 thereof. Prior to closing the door 207, a small plate of glass 215 is inserted into the slot 214 and is held in raised position by a thin knife blade or the like until the door has been nearly closed and until the lower edge of the said plate of glass rests upon the edge of the flange 203 at the lower side of the door opening in the casing. Thus when the door is completely closed after withdrawal of the knife blade or the like, the plate 215 will drop by gravity to the position shown in Figs. 32 and 33 of the drawings in which position its lower end will seat against the beveled side of the flange 203. In this manner the door is normally held closed but it will be understood that when it becomes necessary to release the valve for closing movement through the remote actuating means just described, the handle 211 may be grasped and the door may be forcibly swung to open position. This will, of course, fracture the plate of glass and as the door is so swung a pull will be exerted upon the cable 178 whereby to cause the plunger 160 to slide outwardly in the bore 78 against the tension of the spring 127 to produce the desired result in a manner which will be made clear in the description of operation of the valve. It will be understood, of course, that by loosening the nut 189 or, in other words, threading the same back out of engagement with the threads 188, and also rotating the section 182 to disconnect the same from the connection 174, the said section 182 may be slid upon the section 185 away from the valve device so as to expose the cable clamp 180 to permit of connection, disconnection and tightening of the cable. It will also be understood that the connection or union comprising the telescopic parts 182 and 185 may be located at the pull box instead of at the valve device if desired, or one of the unions may be located at the pull box and another at the valve.

As before stated, the shaft 33 is designed to be rotated through the medium of a specially constructed wrench for the purpose of setting the valve to open position, and to provide for the application of the wrench, the said shaft is provided at its outer end with a projecting stud 216. The said wrench is indicated in general by the numeral 217 and comprises a shank 218 provided at one end with a handle 219 whereby it may be conveniently grasped and rotated. At its other end the wrench is formed with a head 220 exteriorly of a diameter to fit rotatably within the bushing 42 and this head is formed with a socket 221 opening through its end and designed to fit over the outer end of the said shaft 33 or more specifically speaking, the portion 36 of the said shaft, the wall of the socket being formed with a notch 222 to receive the projecting stud 216 whereby the wrench will be connected with the said shaft to rotate the latter when the wrench is turned. At the inner end of the head 220 the shank of the wrench is formed with a circumscribing collar 223 having a notch 224 to permit of passage of the collar past a pin 225 which is fitted through the extension 27 of the valve casing with its inner end projecting into the bore of the said extension. It will now be understood that by inserting the head of the wrench into the bore of the extension 27 and rotating the wrench to bring the notch 224 into position opposite the inner end of the pin 225, the wrench may be further inserted into the said bore so that the collar 223 will pass the said inner end of the pin 225 and so that the collar 37 will straddle the inner end of the pin 40. The wrench may then be rotated so as to impart rotary motion to the shaft 33 in a direction to cause setting of the valve to open position after which the wrench must be backwardly rotated until the notch 224 in the collar 223 is again opposite the inner end of the pin 225 whereupon the wrench may be removed. It will be clear from the foregoing that in order to remove the wrench after setting the valve to open position it is absolutely necessary to backwardly rotate the said wrench and consequently rotate the shaft 33 backwardly to its original position before the wrench can be removed and thus when the valve is released for closing movement and the arm 45 is swung toward the outlet end of the valve casing through the force exerted by the spring 24, the spring will not be required to overcome the friction which would otherwise be present if the shaft 33 was permitted to remain in position with the stud 50 engaging the stud 51 and therefore there is less resistance offered to the closing of the valve under the influence of the said spring. It will also be understood that the pin 225 serves to hold the wrench in engagement with the pin upon the shaft 33 while turning the shaft.

In order to provide means whereby the outer end of the bore in the extension 27 may be closed so as to prevent the reinsertion of the wrench by an unauthorized person after the valve has been once set in open position, there is provided a seal of the form shown in Fig. 28 or that shown in Fig. 30. The seal shown in Fig. 28 is indicated in general by the numeral 226 and comprises sections 227 and 228, these sections each comprising a semi-cylindrical wall 229, a semi-circular wall 230, and an inwardly projecting flange 231, the wall 230 and flange 231 being located at the opposite side of the semi-cylindrical wall 229 and the walls 230, when the seal is closed, being designed to have their chordal edges brought into engagement with each other as shown in Fig. 28 whereby to completely close the open end of the bore 29. The flanges 231 of the two sections are designed to circumscribe the extension 27 and seat in a notch 232 formed in a thickened portion 233 of the said extension 27 so that when the seal is closed it will be prevented from withdrawal from engagement with the extension until the sections thereof have been swung to open position. The member 227 of the seal is formed at one end of its wall 229 with a tongue 234 designed to be engaged in an eye or loop 235 formed at the corresponding end of the wall 229 of the section 228. At the opposite end of the wall 229 of each section there is formed a projecting nose 236 the said noses being flat faced and designed to be brought into contact with each other when the sections of the seal are closed about the extension 27, the outer sides of the noses being relatively inclined as clearly shown in Fig. 28. The nose 236 of one section is formed in its inclined face with a recess 237 in which recess there is secured a leaf spring latch tongue 238 the free end of which projects a short distance beyond the plane of the nose. When the sections have been closed and the noses 236 thereof have been brought together a lock such as shown in Fig. 29 of the drawings is slipped on to the meeting noses for the purpose of locking the sections against separation. This lock is indicated in general by the numeral 239 and the same comprises parallel sides 240 and 241, a side 242, a side 243, and a closed end 244. The sides 242 and 243 are located in relatively diverging planes so that the lock is smaller at its closed end than at its open end, and at the said open end of the lock, the wall 243 is formed with a short inwardly projecting flange 244 behind which the free end of the spring latch 238 is designed to engage in the manner shown in Fig. 28 of the drawings when the lock is fitted on to the lips 236 of the members comprising the seal. By reference to Fig. 29 of the drawings it will be observed that the wall 241 of the lock is formed with a slot or incision 245 extending the entire length of the said wall and that the wall 240 is formed with a similar slot 246 which however, near the open end of the lock, is crossed by an outwardly bulged connecting piece 247 integral with the said side 240 at the opposite sides of the slot 246. It will now be understood that after the lock has been applied to the lips 236 of the members comprising the seal, these members will be securely held against separation. However, when the seal is to be removed for the purpose of resetting the valve to open position, the projecting portion 247 may be broken down or severed so as to permit of the portions of the lock at the opposite sides of the slots 245 and 246 being spread apart. In that form of the seal shown in Fig. 30, the lip 236 of one member is provided with a hasp 247 designed to seat through a notch 248 formed in the lip 236 of the other member of the seal. Engaged with the hasp 247 is the bail 249 of a keyless lock 250.

As before stated, the cap 105 of the dome 10 is secured in place by means of bolts 106 which pass through ears 107 and 108 upon the cap and dome respectively, and in order to prevent unauthorized removal of the cap and also to indicate when the valve has been subjected to heat to such a degree of temperature as would be likely to injure the mechanism thereof or impair the efficiency of the valve, it is preferable that one or more of the lugs 107 and 108 be provided with unthreaded openings 251 which are brought into alinement when the cap is properly applied to the dome and into which openings may be poured a fusible metal composition which will fuse at a degree of temperature which would injure the valve or its controlling devices.

The operation of the valve is as follows: Let it be assumed that the valve has been installed in the manner shown in Fig. 1 of the drawings, for example prior to turning on the flow of gas from the main 5 and that, therefore, there is only atmospheric pressure within the valve casing. Under such conditions the parts will assume about the relative positions shown in Fig. 3 of the drawings, the diaphragm 103 being free to sag or hang loosely as shown in the said figure and the wiper 99 being out of engagement with the lug 73. The gas may then be turned on from the main 5 and the wrench 217 is then inserted into the extension 27 of the valve casing and is turned so as to rotate the shaft 33 and bring the threaded stud 50 into engagement with the stud 51. As this rotative movement is continued, the arm 45 will be swung in the direction of the valve 18 thereby causing the thrust link 52 to exert a thrust against the valve 18 causing the valve to move to open position against the tension of the spring 24 and until, in fact, it reaches about the position shown in Fig. 2 of the drawings. As the shaft 33 is rotated in the manner stated and as the arm 45 swings toward the valve, a pull will be exerted upon the link 72 causing the trip lever 69 to rock upon its pivot so that the primary bevel 74 of the lug 73 will ride against the primary bevel 100 of the wiper 99 as shown in Fig. 18 of the drawings, the rotation of the shaft 33 being continued until the abutment member 62 comes in contact with the valve casing. At such time the end of the bevel 74 will have passed the primary bevel 100 of the wiper and the pressure of the gas entering the valve casing will move the diaphragm 103 to position against the auxiliary diaphragm 116 and as the auxiliary diaphragm is tensioned to a degree slightly less than the degree of pressure of the gas against the main diaphragm at normal, both diaphragms will be slightly outwardly bulged, as shown in Fig. 2 of the drawings. This movement of the diaphragm 103 will cause the diaphragm lever 92 to rock upon its pivot in a manner to bring the secondary bevel 101 of the wiper 99 into engagement against the secondary bevel 75 of the lug 73 as shown in Figs. 2 and 16 of the drawings. Referring now particularly to Fig. 2 it will be understood that while the spring 24 exerts great force against the valve 18 tending to move the said valve to closed position, only a relatively small amount of this force is transmitted through the thrust link 52, arm 45, and link 72 to the trip lever so that while there is a force acting upon the trip lever in a manner to cause the secondary bevel 75 of the lug 73 to bear outwardly against the secondary bevel of the wiper 95 thus tending to rock the diaphragm lever 92 upon its pivot in a manner to cause disengagement of the said lug and wiper by riding past each other, this force is relatively slight and is counteracted or resisted by the pressure of the gas against the diaphragm 103. Thus so long as the gas pressure remains normal or does not fall below or rise above the low and high limits for which the valve has been adjusted, the secondary bevels of the wiper and lug will remain in contact and the trip lever will be held against movement upon its pivot through the influence of the valve closing spring 24. As heretofore stated, the diaphragm 116 is, when placed in position, put under a tension slightly less than the pressure which would be exerted against it by the gas at normal pressure within the valve casing so that so long as the pressure does not lower or rise to the selected low and high degrees at which the valve is to be automatically closed, the diaphragm 103 will rest against the diaphragm 116 and be backed or supported thereto as shown in Fig. 2 if the drawings. In rotating the shaft 33 in the manner above stated to set the valve to open position, and as the lug 73 sweeps past the wiper 99, the arm 89 will be rocked slightly in a direction away from the adjacent wall of the dome of the valve casing as shown in Fig. 18 so as to permit of the lug passing the said wiper and as the arm 89 is rocked in the manner stated, the shaft 86 will, of course, be correspondingly rocked against the tension of the torsional spring 127, the thrust member 149 being at such time moved away from the cap 156 as shown in Fig. 19 of the drawings but being promptly returned to its original or normal position as shown in Fig. 17 as soon as the lug 73 has passed the wiper 99. The parts are now in the position shown in Figs. 2, 16 and 17 of the drawings. The wrench is now turned backwardly to permit of its removal and for the purpose heretofore stated and the seal before described is then applied to the extension 27.

Let it be assumed now that from one of the various reasons heretofore set forth, the gas pressure within the valve casing lowers to such a degree that combustion will not be supported at the burners. When this occurs the diaphragm 103, being relieved of pressure will no longer resist the swinging of the diaphragm lever 92 upon its pivot under the pressure exerted by the secondary beved 75 of the lug 73 against the secondary bevel 101 of the wiper and therefore these bevels will slip past each other in the manner shown in Fig. 20 of the drawings until they are completely out of mutual engagement. The spring 24 will then act immediately to forcibly close the valve 18 and the parts will assume the positions shown in Fig. 3 of the drawings. At this point it will be understood that upon the decrease in pressure noted, the auxiliary diaphragm will collapse or move inwardly to the position shown in Fig. 3, assisting the movement of the main diaphragm in the corresponding direction. It will now be apparent that even should the seal be removed from the extension 27 of the valve casing by an unauthorized person and should an attempt be made to reset the valve to open position through the employment of the wrench or any other tool, the valve would not remain in this position but would again immediately close when released due to the fact that the gas pressure within the valve casing would still be abnormally low. Therefore, it is impossible to reset the valve to open position until the gas pressure has been restored to a degree above the abnormally low and below the abnormally high degree at which the valve is to close automatically.

Instead of the pressure falling to an abnormally low degree where combustion would not be supported at the burners, it may happen that the pressure will rise to a dangerously high degree. In this event, the parts being in the position shown in Fig. 2 of the drawings, the high degree of pressure acting against the diaphragm 103 would force not only this diaphragm but also the diaphragm 116 outwardly into the concavity of the cap 105 in the manner shown in Fig. 4 of the drawings. Inasmuch as the arm 93 of the diaphragm lever 92 is connected with the diaphragm 103, this arm of the lever will under such conditions be swung outwardly in the manner shown in Fig. 21 of the drawings thus causing the secondary bevel 101 of the wiper 99 to leave the secondary bevel 75 of the lug 73, releasing the trip lever 69 and permitting the spring 24 to act to immediately close the valve as show in Fig. 4 of the drawings. In connection with this feature it will be understood that under these conditions the valve could not be successfully reset to open position until the pressure had fallen a degree below the abnormally high degree of which the valve is to close automatically.

It will be assumed now that because of the presence of fire or for other valid reasons it has become necessary to close the cut-off valve. In order to accomplish this result it is only necessary to grasp the collar 131 and to rotate the same toward the right in Fig. 17 of the drawings and to the position illustrated in Fig. 23 of the drawings. As the collar is thus turned the thrust member 149 will, through its action against the pin 141, impart rotary motion to the shaft 86. As the arm 89 is fixed upon this shaft the said arm will be rocked in a direction away from the adjacent portion of the wall of the dome of the casing and as the diaphragm lever 92 is carried by the said arm and the said lever is by reason of the gas pressure against the diaphragm, held against rocking movement, it will be shifted bodily in the manner shown in Fig. 22 of the drawings whereby to cause the secondary bevel 101 of the wiper 99 to ride along and pass the secondary bevel of the lug 73 so that the trip lever 69 will be released thereby permitting the spring 24 to immediately move the valve to closed position. It will be observed that the manual rotation of the collar 131 does not in any way affect the thermostatic device of which the thrust member 149 is a part.

Should it be desired to close the valve manually from a distance, the pull box heretofore described is operated by pulling upon the handle 211 thereby exerting a pull upon the cable 178. The pull exerted upon this cable will result in the plunger 160 being slid longitudinally in the bore 78 of the extension 76 of the valve casing against the tension of the spring 127 and until the sliding movement of the plunger is arrested by the engagement of the stop element 140 with the inner end wall of the slot 165. As the head 161 of the plunger is moved in the manner stated, the inclined wall 169 of the opening 166 will ride against the pin 141 and due to the inclination of this wall, the pin will be forced to the right in Fig. 17 of the drawings and to about the position shown in Fig. 19 of the drawings thus imparting rocking motion of the shaft 86 and causing the arm 89 to rock and bodily move the diaphragm lever 92 and cause disengagement of the secondary bevel of the wiper from the secondary bevel of the lug 73 in the manner shown in Fig. 22 of the drawings. Of course, when the handle 211 is released, the spring 127 will immediately return the plunger to its normal position as shown in Fig. 8 of the drawings and the torsional stress exerted by the spring 127 will backwardly rotate the shaft 86 to its normal position so that the pin 141 will be located in the intermediate position shown in Fig. 17 of the drawings or, in other words, a position substantially midway between the ends of the wall 168 of the opening 166 in the head of the plunger. Another condition to be met with is that of a fire in the vicinity of the valve. When this occurs the fusible plugs 160 will be melted due to the rise in temperature and as the thrust member 149 constantly exerts pressure against the cap 159, the cap will be forced off from the plug 150 in the manner shown in Fig. 25 of the drawings and the torsional stress exerted by the spring 127 and the force exerted by the spring 24 through the bevels of the trip cam members will cause the shaft 86 to rock toward the left as shown in the said Fig. 25 carrying with it the arm 89, the said arm being rocked toward the said adjacent portion of the dome of the valve casing. As the arm rocks in this manner it will carry bodily with it the diaphragm lever 92 with the result that the secondary bevel 101 of the wiper will move over and past the secondary bevel 75 of the lug 73 and the valve closing spring will then immediately act to close the valve.

As before stated, the thrust member 149 may be adjusted as to length by reason of the threaded connection between its members 145 and 146 and it will be understood that by adjusting this member the position of the arm 89 may be adjusted so as to cause the secondary bevel 101 of the wiper 99 to move toward the inner end of the secondary bevel 75 of the lug 73 or to recede from the said end of the last mentioned bevel so that the high limit of abnormal pressure at which the valve will automatically close may be varied. It will also be understood that by adjusting the ring 25 to vary the tension of the spring 24, the force with which the diaphragm lever is caused to pull inwardly upon the diaphragm 103 may be varied so as to vary the low limit of abnormal pressure at which the valve is to automatically close.

Having thus described the invention, what is claimed as new is:

1. In an automatic cut-off valve of the class described a casing having an inlet and an outlet, a valve in the casing, means acting with pressure directly against one side of the valve tending to move the same to closed position, and pressure controlled means acting directly against the other side of the valve to yieldably resist closing movement of the valve, the last mentioned means being operative in the presence of fluid in the casing between a predetermined minimum degree of pressure and a predetermined maximum degree of pressure and being arranged to be rendered inactive upon decrease in pressure below the minimum degree and increase in pressure above the maximum degree.

2. In an automatic cut-off valve of the class described, a casing having an inlet and an outlet, a valve in the casing, means tending to move the valve to closed position, and pressure controlled means resisting closing movement of the valve in the presence of fluid in the casing between a predetermined minimum degree of pressure and a predetermined maximum degree of pressure and being arranged to be rendered inactive upon decrease in pressure below the minimum degree and increase in pressure above the maximum degree.

3. In an automatic cut-off valve of the class described, a casing having an inlet and an outlet, a valve in the casing, means tending to move the valve to closed position, means yieldably resisting closing movement of the valve in the presence of fluid in the casing under degrees of pressure between a predetermined minimum degree and a predetermined maximum degree, the said means being arranged to be rendered inactive upon decrease in pressure below the minimum degree and increase in pressure above the maximum degree, and manually operable means for rendering the last mentioned means inactive.

4. In an automatic cut-off valve of the class described, a casing having an inlet and an outlet, a valve in the casing, means tending to move the valve to closed position, means yieldably resisting closing movement of the valve in the presence of fluid in the casing under degrees of pressure between a predetermined minimum degree of pressure and a predetermined maximum degree of pressure and being arranged to be rendered inactive upon decrease in pressure below the minimum degree and upon increase in pressure above the maximum degree, and local manually operable means for rendering the last mentioned means inactive.

5. In an automatic cut-off valve of the class described, a casing having an inlet and an outlet, a valve in the casing, means tending to move the valve to closed position, means yieldably resisting closing movement of the valve in the presence of fluid in the casing under degrees of pressure between a predetermined minimum degree of pressure and a predetermined maximum degree of pressure and being arranged to be rendered inactive upon decrease in pressure below the minimum degree and upon increase in pressure above the maximum degree, and means manually operable from a distance for rendering the last mentioned means inactive.

6. In an automatic cut-off valve of the class described, a casing having an inlet and an outlet, a valve in the casing, means tending to move the valve to closed position, means yieldably resisting closing movement of the valve in the presence of fluid in the casing under degrees of pressure between a predetermined minimum degree of pressure and a predetermined maximum degree of pressure and being arranged to be rendered inactive upon decrease in pressure below the minimum degree and upon increase in pressure above the maximum degree, and means manually operable from a distance for rendering the resisting means inoperative.

7. In an automatic cut-off valve of the class described, a casing having an inlet and an outlet, a valve in the casing, means tending to move the valve to closed position, means active under degrees of pressure of fluid within the casing below a predetermined maximum degree to resist closing movement of the valve, and manually operable means for rendering the resisting means inactive.

8. In an automatic cut-off valve of the class described, a casing having an inlet and an outlet, a valve in the casing, means tending to move the valve to closed position, means resisting closing movement of the valve and active under degrees of pressure of fluid within the casing between predetermined minimum and maximum degrees of pressure, and thermostatic means operable in the presence of abnormal degrees of temperature to render the resisting means inactive.

9. In an automatic cut-off valve of the class described, a casing having an inlet and an outlet, a valve in the casing, means tending to move the valve to closed position, means active to resist closing movement of the valve in the presence of fluid in the casing under degrees of pressure between a predetermined minimum degree and a predetermined maximum degree and arranged to be rendered inactive upon decrease in pressure below the minimum degree and upon increase of pressure above the maximum degree, local manually operable means for rendering the resisting means inactive, means manually operable from a distance for rendering the resisting means inactive, and thermostatic means arranged in the presence of abnormally high degrees of temperature to render the said resisting means inactive.

10. In an automatic cut-off valve of the class described, a casing having an inlet and an outlet, a valve within the casing, means tending to close the valve, means resisting closing movement of the valve active under degrees of pressure between predetermined minimum and maximum degrees and including a pressure controlled element and a system of levers acting therebetween and the said valve, one element of said system having a bearing surface, and a wiper element removably secured to another element of the system and having a bevel to coact with the said bearing surface.

11. In an automatic cut-off valve of the class described, a casing having an inlet and an outlet, a normally open valve within the casing, means tending to close the valve, means resisting closing movement of the valve active under degrees of pressure between predetermined minimum and maximum degrees and including a pressure controlled element and a system of levers acting therebetween and the said valve, one element of said system having primary and secondary bevels, and a wiper element removably secured to another element of the system and having primary and secondary bevels to coact with the bevels of the first-mentioned element.

12. A lever element in an automatic cut-off valve of the class described having a slot formed therein, a plate of metal removably secured in said slot, and having a projecting portion constituting a wiper and provided with a wiping surface.

13. In an automatic cut-off valve of the class described, a casing having an inlet and an outlet, a valve within the casing, a pressure controlled element within the casing adapted to cause the operation of the valve, a valve setting arm mounted for oscillatory movement within the casing, means for moving the said arm, a connection between the arm and the valve, an operative connection between the said arm and the pressure controlled element, and means for limiting the movement of the arm in a direction to open the valve.

14. In an automatic cut-off valve of the class described, a casing having an inlet and an outlet, a valve within the casing, a pressure controlled element within the casing adapted to cause the operation of the valve, a valve setting arm mounted for oscillatory movement within the casing, means for moving the said arm, a connection between the arm and the valve, an operative connection between the said arm and the pressure controlled element, and adjustable means for limiting the movement of the arm in a direction to open the valve.

15. In an automatic cut-off valve of the class described, a casing having an inlet and an outlet, a valve within the casing, a pressure controlled element within the casing adapted to cause operation of the valve, a valve setting arm mounted for oscillatory movement within the casing, means for moving the said arm, a connection between the arm and the valve, an operative connection between the said arm and the pressure controlled element, and an adjustable abutment screw threaded through the said arm and arranged to engage a wall of the said casing whereby to limit the movement of the arm in a direction to open the valve.

16. In an automatic cut-off valve of the class described, a casing having an inlet and an outlet, a normally open valve within the casing, means tending to move the valve to closed position, a collapsible and distensible diaphragm within the casing, and an operative connection between the valve and diaphragm resisting closing movement of the valve under degrees of pressure of fluid in the casing between minimum and maximum degrees acting against said diaphragm.

17. In an automatic cut-off valve of the class described, a casing having an inlet and an outlet, a normally open valve within the casing, means tending to move the valve to closed position, a collapsible and distensible diaphragm within the casing, an operative connection between the valve and diaphragm resisting closing movement of the valve under degrees of pressure of fluid in the casing between minimum and maximum degrees acting against the diaphragm, and means backing the diaphragm and yieldably resisting distension thereof.

18. In an automatic cut-off valve of the class described, a casing having an inlet and an outlet, a normally open valve within the casing, means tending to move the valve to closed position, a collapsible and distensible diaphragm within the casing, an operative connection between the valve and diaphragm resisting closing movement of the valve under degrees of pressure of fluid in the casing between minimum and maximum degrees acting against the diaphragm, and an auxiliary diaphragm backing the first-mentioned diaphragm and normally tensioned to a degree less than the degree of pressure exerted against the first-mentioned diaphragm by fluid within the casing at a predetermined normal degree of pressure.

19. In an automatic cut-off valve of the class described, a casing having an inlet and an outlet, a normally open valve within the casing, means tending to move the valve to closed position, a collapsible and distensible diaphragm within the casing, an operative connection between the valve and diaphragm resisting closing movement of the valve under degrees of pressure of fluid in the casing between minimum and maximum degrees acting against the diaphragm, and means yieldably resisting distension of the said diaphragm, the said means comprising an auxiliary resilient diaphragm having a tendency to bulge in the direction of collapse of the first-mentioned diaphragm and normally held against bulging and under a degree of tension less than the normal pressure of fluid acting against the first-mentioned diaphragm.

20. In an automatic cut-off valve of the class described, a casing having an inlet and an outlet, a normally open valve within the casing, means tending to move the valve to closed position, a collapsible and distensible diaphragm within the casing, an operative connection between the valve and diaphragm resisting closing movement of the valve under degrees of pressure of fluid in the casing between minimum and maximum degrees acting against the diaphragm, and means yieldably resisting distension of the said diaphragm comprising an auxiliary diaphragm of resilient sheet material divided by radial slits into yieldable segments, and means supporting and holding the auxiliary diaphragm under tension less than the normal pressure exerted by the fluid in the casing against the first-mentioned diaphragm.

21. In an automatic cut-off valve of the class described, a casing having an inlet and an outlet, a normally open valve within the casing, means tending to move the valve to closed position, the casing having an interiorly concave dome, a collapsible and distensible diaphragm within the casing facing the concavity of the dome, operative connection between the valve and diaphragm resisting closing movement of the valve under degrees of pressure of the fluid in the casing between predetermined minimum and maximum degrees acting against said diaphragm, and a yieldable resilient auxiliary diaphragm peripherally seating within the concavity of the dome and backing the first-mentioned diaphragm.

22. In an automatic cut-off valve of the class described, a casing having an inlet and an outlet, a normally open valve within the casing, means tending to move the valve to closed position, the casing having an interiorly concave dome, a collapsible and distensible diaphragm within the casing facing the concavity of the dome, operative connection between the valve and diaphragm resisting closing movement of the valve under degrees of pressure of the fluid in the casing between predetermined minimum and maximum degrees acting against said diaphragm, an auxiliary diaphragm yieldably resisting distension of the first mentioned diaphragm, and means removably securing the auxiliary diaphragm in place within the said concavity and arranged to permit of yielding movement of the said auxiliary diaphragm in the direction of distension of the first-mentioned diaphragm and preventing movement of the auxiliary diaphragm in the direction of collapse of the first-mentioned diaphragm.

23. In an automatic cut-off valve of the class described, a casing having an inlet and an outlet, a normally open valve within the casing, means tending to move the valve to closed position, the casing having an interiorly concave dome, a collapsible and distensible diaphragm within the casing facing the concavity of the dome, operative connection between the valve and diaphragm resisting closing movement of the valve under degrees of pressure of the fluid in the casing between predetermined minimum and maximum degrees acting against said diaphragm, an auxiliary diaphragm yieldably resisting distension of the first mentioned diaphragm, the said dome being provided with a recess, a bushing seated therein and having an opening formed in its wall with a groove, a pin connected with the auxiliary diaphragm and fitting through the said opening in the bushing and extending into the recess, and a stud carried by the pin and insertible through the said groove and arranged to engage the inner end of the bushing whereby to limit the movement of the auxiliary diaphragm in the direction of collapse of the first-mentioned diaphragm and permitting of movement of the auxiliary diaphragm in the direction of distension of the first-mentioned diaphragm.

24. In an automatic cut-off valve of the class described, a casing having an inlet and an outlet, a normally open valve within the casing, means tending to move the valve to closed position, a collapsible and distensible diaphragm within the casing, operative connection between the valve and diaphragm resisting closing movement of the valve under degrees of pressure of fluid in the casing between predetermined minimum and maximum degrees acting against said diaphragm, the casing having a dome within which the diaphragm is located and provided with a seating shoulder upon which the peripheral portion of the diaphragm is disposed, and a closure cap for the dome having a portion bearing against the peripheral portion of the diaphragm, the said cap having small radial air ducts formed at intervals therein and opening through the edge thereof and communicating with the interior of the said cap.

25. In an automatic cut-off valve of the class described, a casing having an inlet and an outlet, a normally open valve within the casing, means tending to move the valve to closed position, a collapsible and distensible diaphragm within the casing, operative connection between the valve and diaphragm resisting closing movement of the valve under degrees of pressure of fluid in the casing between predetermined minimum and maximum degrees acting against said diaphragm, the casing having a dome within which the diaphragm is located and provided with a seating shoulder upon which the peripheral portion of the diaphragm is disposed, and a closure cap for the dome having a portion seating against the peripheral portion of the diaphragm, the wall of the dome and the said cap having bolt openings therein for the reception of bolts securing the cap to the dome, the openings in the cap being of greater diameter than that of the bolts fitted therethrough, the said cap at the points of location of the said openings therein being spaced from the said wall of the dome and the spaces communicating with the said opening in the cap, and the cap being formed with air ducts communicating at their outer ends with the said openings in the cap and at their inner end with the interior of the cap.

26. In an automatic cut-off valve of the class described, a casing, a normally open valve within the casing, means tending to move the valve to closed position, means resisting closing of the valve arranged to be rendered inactive under a predetermined condition, the casing having an opening in the wall formed with a tapered seat, and means for setting the valve to open position including a shaft rotatably mounted in said opening and provided with a conical portion engaging the seat in a gas tight manner, means holding the shaft in position with the said conical portion thereof so engaging the seat, an element arranged for movement by the shaft, and operative connection between the said element and the valve.

27. In an automatic cut-off valve of the class described, a casing, a normally open valve within the casing, means tending to move the valve to closed position, means resisting closing of the valve arranged to be rendered inactive under a predetermined condition, the casing having an opening in its wall formed with a tapered seat and the casing being further provided with a bore communicating with the seat and opening, and means for setting the valve to open position including a shaft rotatably mounted in the opening and provided with a conical portion engaging the seat in a gas tight manner, an element arranged for movement with the shaft, operative connection between the said element and the valve, the shaft having its outer end extending into the said bore, a collar upon the said end of the shaft resting against the major end of the conical portion of the said shaft, means holding the collar against rotation, a washer disposed upon the said end of the shaft and resting against the outer side of the collar, and a bushing threaded into the bore and bearing against the said washer.

28. In an automatic cut-off valve of the class described, a casing, a normally open valve within the casing, means tending to move the valve to closed position, means resisting closing of the valve arranged to be rendered inactive under a predetermined condition, the casing having an opening in its wall formed with a tapered seat and the casing being further provided with a bore communicating with the seat and opening, and means for setting the valve to open position including a shaft rotatably mounted in the opening and provided with a conical portion engaging the seat in a gas tight manner, an element arranged for movement by the shaft, operative connection between the said element and the valve, the shaft having its outer end extending into the said bore, a collar upon the said end of the shaft resting against the major end of the conical portion of the said shaft, the collar having a peripheral notch, a pin projecting into the bore and seating at its end in said notch, a washer disposed upon the said end of the shaft and resting against the outer side of the collar, and a bushing threaded into the bore and bearing against the said washer.

29. In an automatic cut-off valve of the class described, a casing, a normally open valve within the casing, means tending to move the valve to closed position, means resisting closing of the valve arranged to be rendered inactive under a predetermined condition, the casing having an opening in its wall and being provided with an extension having a bore communicating with the opening, a shaft rotatably mounted in the opening, an element arranged for movement by the shaft, operative connection between the said element and the valve for setting the valve in open position, a projecting stud upon that end of the shaft which extends into the bore of the extension, a stud projecting into the said bore outwardly of the first-mentioned stud, and a wrench for the shaft having a socketed end to engage the said end of the shaft and formed in its wall with a notch to receive the stud upon the shaft, the said wrench having a circumscribing collar to fit rotatably within the bore of the extension, and the said collar having a notch therein to permit of passage of the collar into the said bore of the extension past the second mentioned stud.

30. In a cut-off valve of the class described, a casing, a normally open valve within the casing, means tending to move the valve to closed position, means resisting closing movement of the valve including a trip member operatively connected with the valve and arranged when tripped to release the valve for closing, a detent member normally coacting with and restraining the trip member, a shaft mounted in the wall of the casing and operatively connected with the detent member and arranged when rocked in one direction to render the detent member inactive to restrain the trip member, the casing having an extension into which the shaft extends, a manually rotatable collar mounted upon the said extension of the casing, and operative connection between the said collar and shaft for rotating the latter when the collar is turned.

31. In a cut-off valve of the class described, a casing, a normally open valve within the casing, means tending to move the valve to closed position, means resisting closing movement of the valve including a trip member operatively connected with the valve and arranged when tripped to release the valve for closing, a detent member normally coacting with and restraining the trip member, a shaft mounted in the wall of the casing and operatively connected with the detent member and arranged when rocked in one direction to render the detent member inactive to restrain the trip member, a collar manually rotatable to rotate the shaft, means connected with the shaft tending to rotate the same in a direction opposite that in which it is rotated through manual rotation of the collar, and means for limiting the backward rotation of the collar.

32. In a cut-off valve of the class described, a casing, a normally open valve within the casing, means tending to move the valve to closed position, means resisting closing movement of the valve including a trip member operatively connected with the valve and arranged when tripped to release the valve for closing, a detent member normally coacting with and restraining the trip member, a shaft mounted in the wall of the casing and operatively connected with the detent member and arranged when rocked in one direction to render the detent member inactive to restrain the trip member, the casing having an extension, a collar rotatably mounted upon the extension and manually operable to rotate the shaft, the extension having a shoulder against which one face of the collar is to seat and the said extension and collar being respectively exteriorly and interiorly tapered whereby to provide a water tight connection between the said parts, the collar being formed interiorly with a groove having an inclined wall at one end, and a stop element upon the said extension having a portion engaging in said groove and designed by the engagement thereagainst of the said inclined wall of the groove to limit the backward rotation of the collar and to hold the collar to cause said face of the collar to seat snugly against the said shoulder.

33. In a cut-off valve of the class described, a casing, a normally open valve within the casing, means tending to move the valve to closed position, means resisting closing movement of the valve including a trip member operatively connected with the valve and arranged when tripped to release the valve for closing, a detent member normally coacting with and restraining the trip member, a shaft mounted in the wall of the casing and operatively connected with the detent member and arranged when rocked in one direction to render the detent member inactive to restrain the trip member, the said casing having an extension formed with an opening in a side thereof, a collar rotatably mounted upon the said extension and having an abutment portion, means connected with the shaft tending to rotate the same in a backward direction, and a thrust element having crank connection with the shaft at one end and extending through the opening in the extension and bearing at its other end normally against the abutment portion upon the collar.

34. In a cut-off valve of the class described, a casing, a normally open valve within the casing, means tending to move the valve to closed position, means resisting closing movement of the valve including a trip member operatively connected with the valve and arranged when tripped to release the valve for closing, a detent member normally coacting with and restraining the trip member, a shaft mounted in the wall of the casing and operatively connected with the detent member and arranged when rocked in one direction to render the detent member inactive to restrain the trip member, the said casing having an extension formed with an opening in a side thereof, a collar rotatably mounted upon the said extension and having an abutment portion, means connected with the shaft tending to rotate the same in a backward direction, and a thrust element having crank connection with the shaft at one end and extending through the opening in the extension and bearing at its other end normally against the abutment portion upon the collar, the said thrust element being adjustable as to length whereby to provide for angular adjustment of the shaft to vary the position of the detent member with relation to the trip member.

35. In a cut-off valve of the class described, a casing, a normally open valve within the casing, means tending to move the valve to closed position, means resisting closing movement of the valve including a trip member operatively connected with the valve and arranged when tripped to release the valve for closing, a detent member normally coacting with and restraining the trip member, a shaft mounted in the wall of the casing and operatively connected with the detent member and arranged when rocked in one direction to render the detent member inactive to restrain the trip member, the said casing having an extension provided with an opening, a collar rotatably mounted upon the said extension and formed interiorly with a circumferentially extending groove, a stop element upon the extension arranged by engagement with an end wall of the groove to limit the rotary movement of the collar in one direction, a spring connected with the shaft tending to rotate the shaft in a corresponding direction, a crank element upon the shaft, an abutment element located at the other end of the said groove in the collar, and a thrust element connected with the crank element upon the shaft and engaging the said abutment element upon the collar and extending through the opening in the said extension in the casing.

36. In a cut-off valve of the class described, a casing, a normally open valve within the casing, means tending to move the valve to closed position, means resisting closing movement of the valve including a trip member operatively connected with the valve and arranged when tripped to release the valve for closing, a detent member normally coacting with and restraining the trip member, a shaft mounted in the wall of the casing and operatively connected with the detent member and arranged when rocked in one direction to render the detent member inactive to restrain the trip member, the said casing having an extension provided with an opening, a collar rotatably mounted upon the said extension and formed interiorly with a circumferentially extending groove, a stop element upon the extension arranged by engagement with an end wall of the groove to limit the rotary movement of the collar in one direction, a spring connected with the shaft tending to rotate the shaft in a corresponding direction, a crank element upon the shaft, an abutment element located at the other end of the said groove in the collar, and a thrust element adjustable as to length and connected with the crank element upon the shaft and engaging said abutment element upon the collar and extending through the opening in the said extension in the casing.

37. In a cut-off valve of the class described, a casing, a normally open valve within the casing, means tending to move the valve to closed position, means resisting closing movement of the valve including a trip member operatively connected with the valve and arranged when tripped to release the valve for closing movement, a detent member normally coacting with and restraining the trip member, a shaft rotatably mounted in the wall of the casing, operative connection between the detent member and the shaft arranged, when the shaft is rocked in one direction, to render the detent member inactive to restrain the trip member, a torsion spring upon the shaft fixed at one end with relation to an element with respect to which the shaft is rotatable and at its other end connected with the shaft and by its torsion tending to rotate the shaft in a direction the opposite to that in which it is to be rotated to render the detent member inactive, and manually operable means rotatably mounted upon the extension and having operative connection with the shaft for rotating the shaft against the torsional tension of the spring.

38. In a cut-off valve of the class described, a casing, a normally open valve within the casing, means tending to move the valve to closed position, means resisting closing movement of the valve including a trip member operatively connected with the valve and arranged when tripped to release the valve for closing, a detent member normally coacting with and restraining the trip member, a shaft mounted in the wall of the casing and operatively connected with the detent member and arranged when rocked in one direction to render the detent member inactive to restrain the trip member, a torsion spring mounted upon the shaft and connected with the shaft and tending to rotate the shaft in one direction, an abutment element, fusible means holding the said element in place, and a thrust member connected with the said shaft and bearing against the said abutment element and resisting the force of the said spring.

39. In a cut-off valve of the class described, a casing, a normally open valve within the casing, means tending to move the valve to closed position, means resisting closing movement of the valve including a trip member operatively connected with the valve and arranged when tripped to release the valve for closing, a detent member normally coacting with and restraining the trip member, a shaft mounted in the wall of the casing and operatively connected with the detent member and arranged when rocked in one direction to render the detent member inactive to restrain the trip member, means connected with the said shaft tending to rotate the same in such direction, a relatively fixed element having an opening therein, a member held thereto by a fusible connection and closing one end of the said opening, and a thrust member connected with the shaft and bearing against the last mentioned member through the said opening and resisting the force of the said spring.

40. In a cut-off valve of the class described, a casing, a normally open valve within the casing, means tending to move the valve to closed position, means resisting closing movement of the valve including a trip member operatively connected with the valve and arranged when tripped to release the valve for closing, a detent member normally coacting with and restraining the trip member, a shaft mounted in the wall of the casing and operatively connected with the detent member and arranged when rocked in one direction to render the detent member inactive to restrain the trip member, means connected with the shaft tending to rotate the same in said direction, a member having a tapered opening therein and relatively fixed, an abutment member fitted to the last mentioned member, fusible means connecting the members, the abutment member having a portion extending across the minor end of the opening, and a thrust member connected at one end with the shaft and at its other end extending into the opening and bearing against the said abutment member, the last mentioned end of the thrust member being tapered to fit and close the minor end of the opening upon fusing of the said fusible means and detachment of the abutment member, the said thrust member resisting the means tending to rotate the shaft.

41. In a cut-off valve of the class described, a casing, a normally open valve within the casing, means tending to move the valve to closed position, means resisting closing movement of the valve including a trip member operatively connected with the valve and arranged when tripped to release the valve for closing, a detent member normally coacting with and restraining the trip member, a shaft mounted in the wall of the casing and operatively connected with the detent member and arranged when rocked in one direction to render the detent member inactive to restrain the trip member, means connected with the shaft tending to rotate the same in such direction, a relatively fixed member having an opening therein, a cap fitted on to the said relatively fixed member and having a portion extending across one end of the opening to provide an abutment, the said relatively fixed member having a circumferential groove and the said cap having an opening registering therewith, a plug of fusible material occupying the opening and extending into the groove whereby to connect the cap normally with the relatively fixed member and a thrust member having crank connection with the shaft at one end and extending at its other end into the opening in the relatively fixed member and bearing against the abutment portion of the cap.

42. In a cut-off valve of the class described, a casing, a normally open valve within the casing, means tending to move the valve to closed position, means resisting closing movement of the valve including a trip member operatively connected with the valve and arranged when tripped to release the valve for closing, a detent member normally coacting with and restraining the trip member, a shaft mounted in the wall of the casing and operatively connected with the detent member and arranged when rocked in one direction to render the detent member inactive to restrain the trip member, the casing having an extension provided with a bore receiving the outer portion of the shaft, a spring within the bore connected with the shaft and tending to rotate the shaft in a direction opposite to that in which it is to be rocked to render the detent member inactive, a cam member slidably mounted in the said bore, means upon the shaft engageable by the cam member when the member is slid in one direction to cause rocking of the shaft to render the detent member inactive, and a manually operable pull member connected with the said cam member.

43. In a cut-off valve of the class described, a casing, a normally open valve within the casing, means tending to move the valve to closed position, means resisting closing movement of the valve and arranged when tripped to release the valve for closing, a detent member normally coacting with and restraining the trip means, a shaft mounted in the wall of the casing and operatively connected with the detent member and arranged when rocked in one direction to render the detent member inactive to restrain the trip member, the said casing having an extension provided with a bore receiving the outer portion of the shaft, means tending to rotate the shaft in a direction the opposite to that in which it is to be rotated to render the detent member inactive, a member slidably mounted within the bore and having an opening one wall of which is inclined with relation to the axis of the shaft, a projecting element upon the shaft engageable by the said wall when the said member is slid in one direction within the bore whereby to impart rotary motion to the shaft in a direction to render the detent inactive, and a manually operable pull element connected with the said member.

44. In a cut-off valve of the class described, a casing, a normally open valve within the casing, means tending to move the valve to closed position, means resisting closing movement of the valve including a trip member operatively connected with the valve and arranged when tripped to release the valve for closing, a detent member normally coacting with and restraining the trip member, a shaft mounted in the wall of the casing and operatively connected with the detent member and arranged when rocked in one direction to render the detent member inactive to restrain the trip member, the casing being provided with an extension having a bore receiving the outer portion of the shaft, means tending to rotate the shaft in a direction the opposite to that in which it is rotated to render the detent inactive, a plunger having a head slidably mounted in the said bore, means limiting the sliding movement of the head, the said head having a stem, a spring bearing against the head and normally holding the same at one limit of its movement, the said head having an opening one wall of which is inclined with relation to the axis of the shaft, a projecting pin upon the shaft engageable by the said wall of the opening when the plunger is slid in one direction against the tension of the said spring and a flexible manually operable pull element connected with the plunger stem.

45. In a cut-off valve of the class described, a casing, a normally open valve within the casing, means tending to move the valve to closed position, means resisting closing movement of the valve including a trip member operatively connected with the valve and arranged when tripped to release the valve for closing, a detent member normally coacting with and restraining the trip member, a shaft mounted in the wall of the casing and operatively connected with the detent member and arranged when rocked in one direction to render the detent member inactive to restrain the trip member, means tending to rotate the shaft in a direction opposite to the direction in which it is to be rotated to render the detent inactive, a member movable longitudinally of the shaft, coacting means upon the said member and shaft for so rotating the shaft when the said member is moved in one direction longitudinally of the shaft, a flexible element connected with the said member at one end, a casing into which the other end of the flexible element extends, and a hinged closure for the casing to which the said end of the flexible element is connected.

46. In a cut-off valve of the class described, a casing, a normally open valve within the casing, means tending to move the valve to closed position, means resisting closing movement of the valve including a trip member operatively connected with the valve and arranged when tripped to release the valve for closing, a detent member normally coacting with and restraining the trip member, a shaft mounted in the wall of the casing and operatively connected with the detent member and arranged when rocked in one direction to render the detent member inactive to restrain the trip member, means tending to rotate the shaft in a direction opposite to the direction in which it is to be rotated to render the detent inactive, a member movable longitudinally of the shaft, coacting means upon the said member and shaft for rotating the shaft so as to render the detent inactive when the said member is moved in one direction longitudinally of the shaft, a flexible element connected with the said member at one end, a casing into which the other end of the flexible element extends, and frangible means for holding the closure in closed position.

47. In a cut-off valve of the class described, a casing, a normally open valve within the casing, means tending to move the valve to closed position, means resisting closing movement of the valve including a trip member operatively connected with the valve and arranged when tripped to release the valve for closing, a detent member normally coacting with and restraining the trip member, a shaft mounted in the wall of the casing and operatively connected with the detent member and arranged when rocked in one direction to render the detent member inactive to restrain the trip member, means tending to rotate the shaft in a direction opposite to the direction in which it is to be rotated to render the detent inactive, a member movable longitudinally of the shaft, coacting means upon the said member and shaft for rotating the shaft so as to render the detent inactive when the said member is moved in one direction longitudinally of the shaft, a flexible element connected with the said member at one end, a casing into which the other end of the flexible element extends, a closure for the last named casing, said casing being provided interiorly with a flange against which the closure is to seat, the said closure upon its inner face having a socket, and a frangible element seated in the socket and resting by gravity behind a portion of the said flange.

48. In an automatic cut-off valve of the class described, a casing, a normally open valve within the casing, means tending to move the valve to closed position, means resisting closing of the valve and arranged to be rendered inactive under a predetermined condition, a resetting means for the valve including a rotatable shaft mounted in one wall of the casing, the casing having an extension housing the outer end of the said shaft and arranged for the introduction thereinto of a wrench for rotating the shaft, the said extension having an exterior shoulder, means for closing the opening in the said extension comprising a seal including hingedly connected sections having a portion for engagement behind the shoulder and portions to close the said opening in the extension, the said sections of the seal having meeting lip portions, and sealing means connecting the lip portions against separation.

49. In an automatic cut-off valve of the class described, a casing, a normally open valve within the casing, means tending to move the valve to closed position, means resisting closing of the valve and arranged to be rendered inactive under a predetermined condition, a resetting means for the valve including a rotatable shaft mounted in one wall of the casing, the casing having an extension housing the outer end of the said shaft and arranged for the introduction thereinto of a wrench for rotating the shaft, the said extension having an exterior shoulder, means for closing the opening in the said extension comprising a seal including hingedly connected sections having a portion for engagement behind the shoulder and portions to close the said opening in the extension, the said sections of the seal having meeting lip portions, one of the lip portions having a spring catch thereon, and a locking member designed to be fitted on to the meeting lip portions and having a shoulder engageable by the said latch.

50. In an automatic cut-off valve of the class described, a casing, a normally open valve within the casing, means tending to move the valve to closed position, means resisting closing of the valve and arranged to be rendered inactive under a predetermined condition, a resetting means for the valve including a rotatable shaft mounted in one wall of the casing, the casing having an extension housing the outer end of the said shaft and arranged for the introduction thereinto of a wrench for rotating the shaft, the said extension having an exterior shoulder, means for closing the opening in the said extension comprising a seal including hingedly connected sections having a portion for engagement behind the shoulder and portions to close the said opening in the extension, the said sections of the seal having meeting lip portions, a spring latch upon one of the said lip portions, and a locking member of hollow form open at one end and closed at the other end and arranged to be fitted on to the lip portions and having a shoulder to be engaged by the said spring catch, one side wall of the locking member being slit longitudinally and the opposite side wall being correspondingly split and having its portions at the opposite sides of the slit connected by a destructible ridge piece.

51. In a cut-off valve of the class described, a casing, a normally open valve within the casing, means tending to close the valve, means resisting closing of the valve, a sliding member arranged when slid in one direction to render the resisting means inactive, the said sliding member having a stem, a member connected with the casing and guiding the said stem and having a threaded portion, a tubular guiding and conducting member, a union between the guiding and conducting member and the said threaded member, the said union including a tubular member having threaded connection with the said threaded member and normally housing the end of the said stem, the said tubular member being interiorly reduced at its outer end to provide an interior shoulder, the said union also including a tubular member telescopically fitted within the first-mentioned member of the union and provided exteriorly with a shoulder to engage the shoulder within the first-mentioned member of the union in a snug manner, the second mentioned member of the union being exteriorly threaded inwardly of its shoulder, a nut threaded on to the second mentioned member of the union and adapted to bear against the outer end of the first-mentioned member of the union, the other end of the second mentioned member of the union being connected with the said tubular conducting and guiding member, a flexible element connected with the said end of the stem, and a manually operable pull element connected with the said flexible element at the other end of the conducting and guiding member.

52. In a cut-off valve of the class described, a casing, a normally open valve within the casing, means tending to move the valve to closed position, means resisting closing movement of the valve including a trip member operatively connected with the valve and arranged when tripped to release the valve for closing, a detent member normally coacting with and restraining the trip member, a shaft mounted in the wall of the casing and operatively connected with the detent member and arranged when rocked in one direction to render the detent member inactive to restrain the trip member, means tending to rotate the shaft in a direction opposite to the direction in which it is to be rotated to render the detent inactive, a member movable longitudinally of the shaft, coacting means upon the said member and shaft for rotating the shaft so as to render the detent inactive when the said member is moved in one direction longitudinally of the shaft, a flexible element connected with the said member at one end, a casing into which the other end of the flexible element extends, a hinged closure for the casing to which the said end of the flexible element is connected, and means for limiting the opening movement of the closure and thereby limiting the pull which may be exerted upon the said flexible element.

53. In a cut-off valve of the class described, a casing, a normally open valve within the casing, means tending to move the valve to closed position, means resisting closing movement of the valve including a trip member operatively connected with the valve and arranged when tripped to release the valve for closing movement, a detent member normally coacting with and restraining the trip member, the casing having a hollow extension in one wall, a conical seat within the extension, a shaft rotatably mounted in the extension and having a conical portion fitting the said seat in a gas-tight manner, operative connection between the detent member and the shaft arranged, when the shaft is rocked in one direction, to render the detent member inactive to restrain the trip member, a combined compression and torsion spring connected with the shaft and by its compressive force serving to hold the shaft in position with the conical portion thereof firmly resting in the seat and by its torsion tending to rotate the shaft in a direction opposite to that in which it is to be rotated to render the detent member inactive, and manually operable means rotatably mounted upon the extension and having operative connection with the shaft for rotating the shaft against the torsional tension of the spring.

54. In a cut-off valve of the class described, a casing, a normally open valve within the casing, means tending to move the valve to closed position, means resisting closing movement of the valve including a trip member operatively connected with the valve and arranged when tripped to release the valve for closing, a detent member normally coacting with and restraining the trip member, a shaft mounted in the wall of the casing and operatively connected with the detent member and arranged when rocked in one direction to render the detent member inactive to restrain the trip member, a torsion spring tending to rotate the shaft in a direction the opposite to that in which it is to be rotated to render the detent inactive, and manually operable means for rotating the said shaft so as to render the detent inactive.

55. In a cut-off valve of the class described, a casing, a normally open valve within the casing, means tending to move the valve to closed position, means resisting closing movement of the valve including a trip member operatively connected with the valve and arranged when tripped to release the valve for closing, a detent member normally coacting with and restraining the trip member, a shaft mounted in the wall of the casing and operatively connected with the detent member and arranged when rocked in one direction to render the detent member inactive to restrain the trip member, a member slidably mounted with relation to the shaft, coacting means upon the member and the shaft for rotating the shaft in a direction to render the detent means inactive when the said member is slid in one direction, a manually operable element connected with the shaft and adapted for actuation to rotate the shaft in a direction to render the detent inactive, and a combined compression and torsion spring connected with the shaft and with the slidable member and through its compressive force normally holding the slidable member at one limit of the sliding movement and through its torsional tension normally holding the shaft rotated in a direction to render the detent active.

56. In a cut-off valve of the class described, a casing, a normally open valve within the casing, means tending to move the valve to closed position, means resisting closing movement of the valve including a trip member operatively connected with the valve and arranged when tripped to release the valve for closing, a detent member normally coacting with and restraining the trip member, a shaft mounted in the wall of the casing and operatively connected with the detent member and arranged when rocked in one direction to render the detent member inactive to restrain the trip member, a member slidable with relation to the shaft, a projecting element upon the shaft, means upon the slidable element for coaction with the projecting element to cause rotation of the shaft in a direction to render the detent inactive when the slidable member is slid in one direction, a manually operable member, operative connection between the manually operable member and the projecting element whereby the shaft member is rotated in a direction to render the detent inactive when the manually operable member is actuated in one direction, and a spring resisting the movement of both the manually operable member and the slidable member to rotate the said shaft.

57. In a cut-off valve of the class described, a casing, a normally open valve within the casing, means tending to move the valve to closed position, means resisting closing movement of the valve including a trip member operatively connected with the valve and arranged when tripped to release the valve for closing, a detent member normally coacting with and restraining the trip member, a shaft mounted in the wall of the casing and operatively connected with the detent member and arranged when rocked in one direction to render the detent member inactive to restrain the trip member, the casing being provided with an extension having a bore receiving the outer portion of the shaft, means tending to rotate the shaft in a direction the opposite to that in which it is rotated to render the detent inactive, a plunger having a head slidably mounted in the said bore, means limiting the sliding movement of the head, the said head having a stem, a spring bearing against the head and normally holding the same at one limit of its movement, the said head having an opening one wall of which is inclined with relation to the axis of the shaft, a projecting pin upon the shaft engageable by the said wall of the opening when the plunger is slid in one direction against the tension of the said spring, a flexible manually operable pull element connected with the plunger stem, and a bearing rib surrounding the said head of the plunger to slidably fit within the said bore, the said rib for a portion of its extent following the inclined wall of the opening in the head.

58. In a cut-off valve of the class described, a casing, a normally open valve within the casing, means tending to move the valve to closed position, means resisting closing movement of the valve including a trip member operatively connected with the valve and arranged when tripped to release the valve for closing, a detent member normally coacting with and restraining the trip member, a shaft mounted in the wall of the casing and operatively connected with the detent member and arranged when rocked in one direction to render the detent member inactive to restrain the trip member, a plunger slidably mounted in the wall of the casing and surrounding the said shaft, a collar fixed upon the shaft within the plunger, the plunger having an opening one wall of which is inclined with relation to the axis of the plunger, a projecting element upon the collar arranged in the path of movement of the said inclined wall of the opening in the sliding movement of the plunger in one direction whereby when the said plunger is slid in said direction rotary motion will be imparted to the shaft in a direction to render the detent inactive, means for holding the plunger against rotation, the face of the collar which opposes one end of the plunger having a seating groove formed therein, and a spring arranged upon the shaft between the collar and the said end of the plunger and having its coil at one end seating in the said groove.

59. In a cut-off valve of the class described, a casing, a normally open valve within the casing, means tending to move the valve to closed position, means resisting closing movement of the valve including a trip member operatively connected with the valve and arranged when tripped to release the valve for closing, a detent member normally coacting with and restraining the trip member, a shaft mounted in the wall of the casing and operatively connected with the detent member and arranged when rocked in one direction to render the detent member inactive to restrain the trip member, a member slidably mounted with relation to the shaft, coacting means upon the member and the shaft for rotating the shaft in a direction to render the detent means inactive when the said member is slid in one direction, a manually operable element connected with the shaft and adapted for actuation to rotate the shaft in a direction to render the detent inactive, and a combined compression and torsion spring connected with the shaft and with the slidable member and through its compressive force normally holding the slidable member at one limit of the sliding movement and through its torsional tension normally holding the shaft rotated in a direction to render the detent active, the said spring constituting also means for returning the slidable member to its normal position after it has been slid and released.

60. In a cut-off valve of the class described a casing, a normally open valve within the casing, means tending to move the valve to closed position, means resisting closing movement of the valve including a trip member operatively connected with the valve and arranged when tripped to release the valve for closing, a detent member normally coacting with and restraining the trip member, a shaft mounted in the wall of the casing and operatively connected with the detent member and arranged when rocked in one direction to render the detent member inactive to restrain the trip member, a member slidable with relation to the shaft, a projecting element upon the shaft, means upon the slidable element for coaction with the projecting element to cause rotation of the shaft in a direction to render the detent inactive when the slidable member is slid in one direction, a manually operable member, operative connection between the manually operable member and the projecting element whereby the shaft member is rotated in a direction to render the detent inactive when the manually operable member is actuated in one direction, and a spring resisting the movement of both the manually operable member and the slidable member to rotate the said shaft, the said spring constituting also means for returning the slidable member to its normal position after it has been slid and released.

61. In a cut-off valve of the class described, a casing, a normally open valve within the casing, means tending to move the valve to closed position, means resisting closing movement of the valve including a trip member operatively connected with the valve and arranged when tripped to release the valve for closing, a detent member normally coacting with and restraining the trip member, a shaft mounted in the wall of the casing and operatively connected with the detent member and arranged when rocked in one direction to render the detent member inactive to restrain the trip member, the casing being provided with an extension having a bore receiving the outer portion of the shaft, means comprising a spring tending to rotate the shaft in a direction the opposite to that in which it is rotated to render the detent inactive, a plunger having a head slidably mounted in the said bore, means limiting the sliding movement of the head, the said head having a stem, said spring bearing against the head and normally holding the same at one limit of its movement, the said head having an opening one wall of which is inclined with relation to the axis of the shaft, a projecting pin upon the shaft engageable by the said wall of the opening when the plunger is slid in one direction against the tension of the said spring, a flexible manually operable pull element connected with the plunger stem, and a bearing rib surrounding the said head of the plunger to slidably fit within the said bore, the said rib for a portion of its extent following the inclined wall of the opening in the head, the said spring constituting also means for returning the plunger to its normal position after it has been slid and released.

62. In a cut-off valve of the class described, a casing, a normally open valve within the casing, means tending to move the valve to closed position, means resisting closing movement of the valve including a trip member operatively connected with the valve and arranged when tripped to release the valve for closing, a detent member normally coacting with and restraining the trip member, a shaft mounted in the wall of the casing and operatively connected with the detent member and arranged when rocked in one direction to render the detent member inactive to restrain the trip member, a plunger slidably mounted in the wall of the casing and surrounding the said shaft, a collar fixed upon the shaft within the plunger, the plunger having an opening one wall of which is inclined with relation to the axis of the plunger, a projecting element upon the collar arranged in the path of movement of the said inclined wall of the opening in the sliding movement of the plunger in one direction whereby when the said plunger is slid in said direction rotary motion will be imparted to the shaft in a direction to render the detent inactive, means for holding the plunger against rotation, the face of the collar which opposes one end of the plunger having a seating groove formed therein, and a spring arranged upon the shaft between the collar and the said end of the plunger and having its coil at one end seating in the said groove, the said spring constituting also means for returning the plunger to its normal position after it has been slid and released.

63. In an automatic cut-off valve of the class described, a casing having an inlet and an outlet, a normally open valve in the casing, means acting with pressure directly against one side of the valve tending to move the same to closed position, and pressure controlled means acting directly against the other side of the valve to yieldably resist closing movement of the valve, the last mentioned means being operative in the presence of fluid in the casing between a predetermined minimum degree of pressure and a predetermined maximum degree of pressure and being arranged to be rendered inactive upon decrease in pressure below the minimum degree.

64. In an automatic cut-off valve of the class described, a casing having an inlet and an outlet, a normally open valve in the casing, means acting with pressure directly against one side of the valve tending to move the same to closed position, and pressure controlled means acting directly against the other side of the valve to yieldably resist closing movement of the valve, the last mentioned means being operative in the presence of fluid in the casing between a predetermined minimum degree of pressure and a predetermined maximum degree of pressure and being arranged to be rendered inactive upon increase in pressure above the maximum degree.

In testimony whereof I affix my signature.

SELBY C. CARR.